United States Patent
Hsu et al.

(10) Patent No.: US 9,395,521 B2
(45) Date of Patent: Jul. 19, 2016

(54) MOBILE DEVICE AND OPTICAL IMAGING LENS THEREOF

(71) Applicant: GeniuS Electronic Optical Co., Ltd., Taichung (TW)

(72) Inventors: Sheng Wei Hsu, Taichung (TW); Tzu-Chien Tang, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 91 days.

(21) Appl. No.: 14/466,985

(22) Filed: Aug. 23, 2014

(65) Prior Publication Data

US 2015/0362697 A1    Dec. 17, 2015

(30) Foreign Application Priority Data

Jun. 17, 2014  (TW) .............................. 103120878 A

(51) Int. Cl.
*G02B 9/62* (2006.01)
*G02B 13/18* (2006.01)
*G02B 13/00* (2006.01)

(52) U.S. Cl.
CPC  *G02B 13/18* (2013.01); *G02B 9/62* (2013.01); *G02B 13/0045* (2013.01)

(58) Field of Classification Search
CPC ........... G02B 9/00; G02B 13/005; G02B 9/62
USPC ......... 359/641, 642, 656, 658, 713, 754, 756, 359/757
See application file for complete search history.

(56) References Cited

U.S. PATENT DOCUMENTS

| 7,957,074 | B2 | 6/2011 | Asami | |
|---|---|---|---|---|
| 2012/0194726 | A1* | 8/2012 | Huang | G02B 13/0045 348/340 |
| 2013/0342918 | A1 | 12/2013 | Kubota | |
| 2014/0327807 | A1* | 11/2014 | Chen | G02B 9/62 348/335 |
| 2014/0327808 | A1* | 11/2014 | Chen | G02B 9/62 348/335 |

FOREIGN PATENT DOCUMENTS

| JP | 201444373 | 3/2014 |
|---|---|---|
| TW | 201348789 | 12/2013 |
| TW | 201400855 | 1/2014 |
| TW | 201416702 | 5/2014 |

OTHER PUBLICATIONS

Official Action from Taiwan Patent Application No. 103120878 dated Dec. 10, 2014.
U.S. Appl. No. 13/963,717, filed Aug. 9, 2013 entitled "Mobile device and optical imaging lens thereof".

* cited by examiner

*Primary Examiner* — Ricky Mack
*Assistant Examiner* — Robert E Tallman
(74) *Attorney, Agent, or Firm* — Baker & McKenzie LLP

(57) ABSTRACT

Present embodiments provide for a mobile device and an optical imaging lens thereof. The optical imaging lens comprises six lens elements positioned sequentially from an object side to an image side. Through controlling the convex or concave shape of the surfaces of the lens elements and designing parameters satisfying at least one inequality, the optical imaging lens shows better optical characteristics and the total length of the optical imaging lens is shortened.

19 Claims, 30 Drawing Sheets

| \multicolumn{7}{|c|}{f(Focus)== 4.022mm, HFOV(Half angular field of view)= 36.642deg., Fno= 2.1, Image height= 3.05mm, System length= 4.98mm} |
|---|---|---|---|---|---|---|---|
| Surface # | | Radius | Thickness | Refractive index | Abbe number | Focus | Material |
| - | Object | ∞ | ∞ | | | | |
| 100 | Aperture stop | ∞ | -0.3251 | | | | |
| 111 | 1st lens element | 1.6144 | 0.6019_T1 | 1.546_n1 | 56.114_v1 | 3.450_f1 | plastic |
| 112 | | 9.7965 | 0.0742_G12 | | | | |
| 121 | 2nd lens element | 3.0495 | 0.2400_T2 | 1.647_n2 | 22.440_v2 | -7.678_f2 | plastic |
| 122 | | 1.8311 | 0.4402_G23 | | | | |
| 131 | 3rd lens element | -31.7646 | 0.5758_T3 | 1.546_n3 | 56.114_v3 | 5.458_f3 | plastic |
| 132 | | -2.7417 | 0.2840_G34 | | | | |
| 141 | 4th lens element | -1.0153 | 0.2953_T4 | 1.647_n4 | 22.440_v4 | -6.062_f4 | plastic |
| 142 | | -1.5264 | 0.0800_G45 | | | | |
| 151 | 5th lens element | 2.8009 | 0.5785_T5 | 1.546_n5 | 56.114_v5 | 3.032_f5 | plastic |
| 152 | | -3.7530 | 0.1425_G56 | | | | |
| 161 | 6th lens element | -4.9778 | 0.5525_T6 | 1.546_n6 | 56.114_v6 | -2.515_f6 | plastic |
| 162 | | 1.9711 | 0.4789_G6F | | | | |
| 171 | IR cut filter | ∞ | 0.3000_TF | 1.518 | 64.166 | | glass |
| 172 | | ∞ | 0.3388_GFP | | | | |
| 180 | Image plane | ∞ | | | | | |

FIG. 4

| Aspherical parameters | | | | | | |
|---|---|---|---|---|---|---|
| Surface # | 111 | 112 | 121 | 122 | 131 | 132 |
| K | 0.00000E+00 | 0.00000E+00 | 0.00000E+00 | 0.00000E+00 | 0.00000E+00 | 6.12607E-01 |
| $a_4$ | 5.22399E-03 | -1.45810E-01 | -2.99463E-01 | -1.87652E-01 | -7.34713E-02 | -1.28253E-02 |
| $a_6$ | 2.36911E-02 | 3.67614E-01 | 5.18317E-01 | 2.67196E-01 | -2.18083E-01 | -1.82805E-01 |
| $a_8$ | -3.53126E-02 | -5.34020E-01 | -6.62995E-01 | -2.65152E-01 | 5.86782E-01 | -1.17260E-01 |
| $a_{10}$ | 3.71739E-02 | 4.60919E-01 | 5.67051E-01 | 2.27814E-01 | -1.09161E+00 | 1.09086E+00 |
| $a_{12}$ | -1.04515E-02 | -1.75222E-01 | -2.34304E-01 | -6.95395E-02 | 9.70035E-01 | -2.05843E+00 |
| $a_{14}$ | 0.00000E+00 | 0.00000E+00 | 0.00000E+00 | 0.00000E+00 | -2.89256E-01 | 1.94320E+00 |
| $a_{16}$ | 0.00000E+00 | 0.00000E+00 | 0.00000E+00 | 0.00000E+00 | 1.31128E-03 | -9.24651E-01 |
| $a_{18}$ | 0.00000E+00 | 0.00000E+00 | 0.00000E+00 | 0.00000E+00 | 0.00000E+00 | 1.75601E-01 |
| $a_{20}$ | 0.00000E+00 | 0.00000E+00 | 0.00000E+00 | 0.00000E+00 | 0.00000E+00 | 0.00000E+00 |
| Surface # | 141 | 142 | 151 | 152 | 161 | 162 |
| K | -1.00000E+00 | -1.00000E+00 | 0.00000E+00 | 0.00000E+00 | 0.00000E+00 | -1.00000E+00 |
| $a_4$ | 5.34844E-01 | 1.46800E-01 | -2.84587E-01 | 2.06760E-02 | -9.79116E-02 | -1.87056E-01 |
| $a_6$ | -1.57097E+00 | -5.37274E-01 | 2.65230E-01 | 6.95499E-02 | 5.92397E-02 | 8.88826E-02 |
| $a_8$ | 3.16032E+00 | 9.93982E-01 | -2.14078E-01 | -1.10078E-01 | -1.70892E-02 | -3.36643E-02 |
| $a_{10}$ | -3.99148E+00 | -8.97364E-01 | 9.16894E-02 | 6.90995E-02 | 4.15086E-03 | 8.90905E-03 |
| $a_{12}$ | 3.37355E+00 | 4.02114E-01 | -2.04591E-02 | -2.38453E-02 | -8.18195E-04 | -1.55657E-03 |
| $a_{14}$ | -1.84519E+00 | -1.98893E-02 | 2.03569E-03 | 4.79037E-03 | 9.77625E-05 | 1.57819E-04 |
| $a_{16}$ | 5.85010E-01 | -6.42685E-02 | 3.60782E-05 | -5.33614E-04 | -4.91607E-06 | -6.78920E-06 |
| $a_{18}$ | -8.20181E-02 | 2.62854E-02 | -5.17844E-05 | 2.55580E-05 | 0.00000E+00 | 0.00000E+00 |
| $a_{20}$ | 0.00000E+00 | -3.31551E-03 | 0.00000E+00 | 0.00000E+00 | 0.00000E+00 | 0.00000E+00 |

FIG. 5

| \multicolumn{7}{c}{f(Focus)= 3.996mm, HFOV(Half angular field of view)= 36.82deg., Fno= 2.1, Image height= 3.05mm, System length= 4.85mm} | | | | | | |
|---|---|---|---|---|---|---|
| Surface # | | Radius | Thickness | Refractive index | Abbe number | Focus | Material |
| - | Object | ∞ | ∞ | | | | |
| 200 | Aperture stop | ∞ | -0.3258 | | | | |
| 211 | 1st lens element | 1.5991 | 0.5405_T1 | 1.546_n1 | 56.114_v1 | 3.416_f1 | plastic |
| 212 | | 9.8783 | 0.0821_G12 | | | | |
| 221 | 2nd lens element | 3.1184 | 0.2535_T2 | 1.647_n2 | 22.440_v2 | -7.628_f2 | plastic |
| 222 | | 1.8500 | 0.4496_G23 | | | | |
| 231 | 3rd lens element | -15.4361 | 0.5565_T3 | 1.546_n3 | 56.114_v3 | 5.886_f3 | plastic |
| 232 | | -2.6939 | 0.3302_G34 | | | | |
| 241 | 4th lens element | -0.9929 | 0.2912_T4 | 1.647_n4 | 22.440_v4 | -11.013_f4 | plastic |
| 242 | | -1.2866 | 0.0902_G45 | | | | |
| 251 | 5th lens element | 2.3280 | 0.3254_T5 | 1.546_n5 | 56.114_v5 | 5.006_f5 | plastic |
| 252 | | 14.9172 | 0.2218_G56 | | | | |
| 261 | 6th lens element | -17.2986 | 0.5683_T6 | 1.546_n6 | 56.114_v6 | -3.327_f6 | plastic |
| 262 | | 2.0534 | 0.4789_G6F | | | | |
| 271 | IR cut filter | ∞ | 0.3000_TF | 1.518 | 64.166 | | glass |
| 272 | | ∞ | 0.3619_GFP | | | | |
| 280 | Image plane | ∞ | | | | | |

FIG. 8

| Aspherical parameters | | | | | | |
|---|---|---|---|---|---|---|
| Surface # | 211 | 212 | 221 | 222 | 231 | 232 |
| K | 0.00000E+00 | 0.00000E+00 | 0.00000E+00 | 0.00000E+00 | 0.00000E+00 | 6.12607E-01 |
| $a_4$ | 4.95265E-03 | -1.48383E-01 | -2.96954E-01 | -1.83963E-01 | -7.57483E-02 | -1.74889E-02 |
| $a_6$ | 2.56865E-02 | 3.68536E-01 | 5.13972E-01 | 2.72762E-01 | -2.24941E-01 | -1.78345E-01 |
| $a_8$ | -3.61660E-02 | -5.35834E-01 | -6.60278E-01 | -2.70667E-01 | 5.96128E-01 | -1.23885E-01 |
| $a_{10}$ | 3.72129E-02 | 4.63813E-01 | 5.66015E-01 | 2.31151E-01 | -1.08680E+00 | 1.08858E+00 |
| $a_{12}$ | -8.37937E-03 | -1.74260E-01 | -2.34004E-01 | -6.65420E-02 | 9.67199E-01 | -2.05720E+00 |
| $a_{14}$ | 0.00000E+00 | 0.00000E+00 | 0.00000E+00 | 0.00000E+00 | -2.92849E-01 | 1.94459E+00 |
| $a_{16}$ | 0.00000E+00 | 0.00000E+00 | 0.00000E+00 | 0.00000E+00 | 4.83285E-03 | -9.24087E-01 |
| $a_{18}$ | 0.00000E+00 | 0.00000E+00 | 0.00000E+00 | 0.00000E+00 | 0.00000E+00 | 1.74900E-01 |
| $a_{20}$ | 0.00000E+00 | 0.00000E+00 | 0.00000E+00 | 0.00000E+00 | 0.00000E+00 | 0.00000E+00 |
| Surface # | 241 | 242 | 251 | 252 | 261 | 262 |
| K | -1.00000E+00 | -1.00000E+00 | 0.00000E+00 | 0.00000E+00 | 0.00000E+00 | -1.00000E+00 |
| $a_4$ | 5.32744E-01 | 1.63684E-01 | -2.94221E-01 | -2.44293E-02 | -1.10098E-01 | -1.88823E-01 |
| $a_6$ | -1.57459E+00 | -5.31516E-01 | 2.57043E-01 | 5.99909E-02 | 5.90522E-02 | 8.81727E-02 |
| $a_8$ | 3.16311E+00 | 9.92945E-01 | -2.17771E-01 | -1.08115E-01 | -1.70793E-02 | -3.35636E-02 |
| $a_{10}$ | -3.98986E+00 | -8.97791E-01 | 9.04572E-02 | 6.96499E-02 | 4.15310E-03 | 8.91530E-03 |
| $a_{12}$ | 3.37338E+00 | 4.02109E-01 | -2.02708E-02 | -2.38097E-02 | -8.18000E-04 | -1.55703E-03 |
| $a_{14}$ | -1.84569E+00 | -1.98445E-02 | 2.20970E-03 | 4.78227E-03 | 9.77701E-05 | 1.57689E-04 |
| $a_{16}$ | 5.84864E-01 | -6.42445E-02 | 8.28096E-05 | -5.37344E-04 | -4.91090E-06 | -6.80681E-06 |
| $a_{18}$ | -8.18075E-02 | 2.62911E-02 | -5.24882E-05 | 2.43989E-05 | 0.00000E+00 | 0.00000E+00 |
| $a_{20}$ | 0.00000E+00 | -3.31565E-03 | 0.00000E+00 | 0.00000E+00 | 0.00000E+00 | 0.00000E+00 |

FIG. 9

| f(Focus)= 4.165mm, HFOV(Half angular field of view)= 36.661deg., Fno= 2.1, Image height= 3.05mm, System length= 5.30mm ||||||||
|---|---|---|---|---|---|---|---|
| Surface # | | Radius | Thickness | Refractive index | Abbe number | Focus | Material |
| - | Object | ∞ | ∞ | | | | |
| 300 | Aperture stop | ∞ | -0.3324 | | | | |
| 311 | 1st lens element | 1.7107 | 0.5748_T1 | 1.546_n1 | 56.114_v1 | 3.665_f1 | plastic |
| 312 | | 10.3855 | 0.0862_G12 | | | | |
| 321 | 2nd lens element | 3.3766 | 0.2519_T2 | 1.647_n2 | 22.440_v2 | -8.129_f2 | plastic |
| 322 | | 1.9961 | 0.4737_G23 | | | | |
| 331 | 3rd lens element | -10.1355 | 0.6376_T3 | 1.546_n3 | 56.114_v3 | 5.962_f3 | plastic |
| 332 | | -2.5185 | 0.2767_G34 | | | | |
| 341 | 4th lens element | -0.8692 | 0.2800_T4 | 1.647_n4 | 22.440_v4 | -7.262_f4 | plastic |
| 342 | | -1.2015 | 0.0753_G45 | | | | |
| 351 | 5th lens element | 2.6142 | 0.4719_T5 | 1.546_n5 | 56.114_v5 | 3.489_f5 | plastic |
| 352 | | -6.5713 | 0.0735_G56 | | | | |
| 361 | 6th lens element | -28.6490 | 0.6500_T6 | 1.546_n6 | 56.114_v6 | -3.291_f6 | plastic |
| 362 | | 1.9322 | 0.4789_G6F | | | | |
| 371 | IR cut filter | ∞ | 0.3000_TF | 1.518 | 64.166 | | glass |
| 372 | | ∞ | 0.6695_GFP | | | | |
| 380 | Image plane | ∞ | | | | | |

FIG. 12

| Aspherical parameters | | | | | | |
|---|---|---|---|---|---|---|
| Surface # | 311 | 312 | 321 | 322 | 331 | 332 |
| K | 0.00000E+00 | 0.00000E+00 | 0.00000E+00 | 0.00000E+00 | 0.00000E+00 | 6.12607E-01 |
| $a_4$ | 4.88067E-03 | -1.49356E-01 | -2.99151E-01 | -1.93757E-01 | -7.61706E-02 | -2.51510E-02 |
| $a_6$ | 2.55084E-02 | 3.67897E-01 | 5.08252E-01 | 2.61664E-01 | -2.23107E-01 | -1.68668E-01 |
| $a_8$ | -3.51870E-02 | -5.38542E-01 | -6.65705E-01 | -2.81005E-01 | 5.90239E-01 | -1.20053E-01 |
| $a_{10}$ | 3.65533E-02 | 4.63981E-01 | 5.70573E-01 | 2.25583E-01 | -1.09237E+00 | 1.08905E+00 |
| $a_{12}$ | -9.94615E-03 | -1.72129E-01 | -2.27933E-01 | -6.72137E-02 | 9.63101E-01 | -2.05780E+00 |
| $a_{14}$ | 0.00000E+00 | 0.00000E+00 | -4.04465E-04 | 2.10607E-04 | -2.91912E-01 | 1.94421E+00 |
| $a_{16}$ | 0.00000E+00 | 0.00000E+00 | 0.00000E+00 | 0.00000E+00 | 5.53465E-03 | -9.24131E-01 |
| $a_{18}$ | 0.00000E+00 | 0.00000E+00 | 0.00000E+00 | 0.00000E+00 | 0.00000E+00 | 1.74911E-01 |
| $a_{20}$ | 0.00000E+00 | 0.00000E+00 | 0.00000E+00 | 0.00000E+00 | 0.00000E+00 | 0.00000E+00 |
| Surface # | 341 | 342 | 351 | 352 | 361 | 362 |
| K | -1.00000E+00 | -1.00000E+00 | 0.00000E+00 | 0.00000E+00 | 0.00000E+00 | -1.00000E+00 |
| $a_4$ | 5.37083E-01 | 1.56415E-01 | -2.71728E-01 | -2.60612E-03 | -1.09609E-01 | -1.85245E-01 |
| $a_6$ | -1.57377E+00 | -5.32972E-01 | 2.50546E-01 | 6.50007E-02 | 5.92341E-02 | 8.80624E-02 |
| $a_8$ | 3.16568E+00 | 9.92164E-01 | -2.10080E-01 | -1.07945E-01 | -1.70825E-02 | -3.35722E-02 |
| $a_{10}$ | -3.98862E+00 | -8.98005E-01 | 9.28411E-02 | 6.94568E-02 | 4.14940E-03 | 8.91322E-03 |
| $a_{12}$ | 3.37317E+00 | 4.02112E-01 | -2.06291E-02 | -2.38733E-02 | -8.18565E-04 | -1.55721E-03 |
| $a_{14}$ | -1.84622E+00 | -1.98221E-02 | 1.90775E-03 | 4.77221E-03 | 9.77892E-05 | 1.57733E-04 |
| $a_{16}$ | 5.84556E-01 | -6.42355E-02 | 3.56793E-05 | -5.36275E-04 | -4.87085E-06 | -6.78204E-06 |
| $a_{18}$ | -8.18369E-02 | 2.62934E-02 | -2.40054E-05 | 2.58657E-05 | 0.00000E+00 | 0.00000E+00 |
| $a_{20}$ | 0.00000E+00 | -3.31621E-03 | 0.00000E+00 | 0.00000E+00 | 0.00000E+00 | 0.00000E+00 |

FIG. 13

| f(Focus)= 4.097mm, HFOV(Half angular field of view)= 36.694deg., Fno= 2.1, Image height= 3.05mm, System length= 5.15mm ||||||||
|---|---|---|---|---|---|---|---|
| Surface # | | Radius | Thickness | Refractive index | Abbe number | Focus | Material |
| - | Object | ∞ | ∞ | | | | |
| 400 | Aperture stop | ∞ | -0.3258 | | | | |
| 411 | 1st lens element | 1.6878 | 0.5129_T1 | 1.546_n1 | 56.114_v1 | 3.706_f1 | plastic |
| 412 | | 9.0840 | 0.0867_G12 | | | | |
| 421 | 2nd lens element | 2.8034 | 0.2400_T2 | 1.647_n2 | 22.440_v2 | -8.965_f2 | plastic |
| 422 | | 1.8264 | 0.5045_G23 | | | | |
| 431 | 3rd lens element | -9.7988 | 0.5861_T3 | 1.546_n3 | 56.114_v3 | 6.319_f3 | plastic |
| 432 | | -2.6055 | 0.2755_G34 | | | | |
| 441 | 4th lens element | -0.8874 | 0.2800_T4 | 1.647_n4 | 22.440_v4 | -6.768_f4 | plastic |
| 442 | | -1.2510 | 0.0873_G45 | | | | |
| 451 | 5th lens element | 2.3343 | 0.3979_T5 | 1.546_n5 | 56.114_v5 | 3.497_f5 | plastic |
| 452 | | -9.8643 | 0.0775_G56 | | | | |
| 461 | 6th lens element | 42.0977 | 0.6175_T6 | 1.546_n6 | 56.114_v6 | -3.555_f6 | plastic |
| 462 | | 1.8459 | 0.4789_G6F | | | | |
| 471 | IR cut filter | ∞ | 0.3000_TF | 1.518 | 64.166 | | glass |
| 472 | | ∞ | 0.7047_GFP | | | | |
| 480 | Image plane | ∞ | | | | | |

FIG. 16

| Aspherical parameters | | | | | | |
|---|---|---|---|---|---|---|
| Surface # | 411 | 412 | 421 | 422 | 431 | 432 |
| K | 0.00000E+00 | 0.00000E+00 | 0.00000E+00 | 0.00000E+00 | 0.00000E+00 | 6.12607E-01 |
| $a_4$ | 5.74319E-03 | -1.47601E-01 | -3.01400E-01 | -1.96049E-01 | -7.54507E-02 | -3.27526E-02 |
| $a_6$ | 2.55134E-02 | 3.68158E-01 | 5.04235E-01 | 2.61396E-01 | -2.18237E-01 | -1.65203E-01 |
| $a_8$ | -3.46368E-02 | -5.41284E-01 | -6.67917E-01 | -2.80387E-01 | 5.87704E-01 | -1.21210E-01 |
| $a_{10}$ | 3.72839E-02 | 4.62315E-01 | 5.70616E-01 | 2.25773E-01 | -1.09371E+00 | 1.08852E+00 |
| $a_{12}$ | -9.95333E-03 | -1.68714E-01 | -2.26689E-01 | -6.63552E-02 | 9.63161E-01 | -2.05780E+00 |
| $a_{14}$ | 0.00000E+00 | 0.00000E+00 | 8.52509E-04 | 1.55906E-03 | -2.91096E-01 | 1.94426E+00 |
| $a_{16}$ | 0.00000E+00 | 0.00000E+00 | 0.00000E+00 | 0.00000E+00 | 5.53465E-03 | -9.24062E-01 |
| $a_{18}$ | 0.00000E+00 | 0.00000E+00 | 0.00000E+00 | 0.00000E+00 | 0.00000E+00 | 1.74990E-01 |
| $a_{20}$ | 0.00000E+00 | 0.00000E+00 | 0.00000E+00 | 0.00000E+00 | 0.00000E+00 | 0.00000E+00 |
| Surface # | 441 | 442 | 451 | 452 | 461 | 462 |
| K | -1.00000E+00 | -1.00000E+00 | 0.00000E+00 | 0.00000E+00 | 0.00000E+00 | -1.00000E+00 |
| $a_4$ | 5.46324E-01 | 1.58762E-01 | -2.82936E-01 | -1.39781E-03 | -1.12608E-01 | -1.90193E-01 |
| $a_6$ | -1.57203E+00 | -5.30445E-01 | 2.51586E-01 | 6.51949E-02 | 5.90046E-02 | 8.78863E-02 |
| $a_8$ | 3.16599E+00 | 9.92708E-01 | -2.09167E-01 | -1.07986E-01 | -1.70979E-02 | -3.35437E-02 |
| $a_{10}$ | -3.98920E+00 | -8.97933E-01 | 9.24681E-02 | 6.94429E-02 | 4.14844E-03 | 8.91990E-03 |
| $a_{12}$ | 3.37264E+00 | 4.02125E-01 | -2.07666E-02 | -2.38810E-02 | -8.18518E-04 | -1.55670E-03 |
| $a_{14}$ | -1.84642E+00 | -1.98144E-02 | 1.90752E-03 | 4.77079E-03 | 9.78388E-05 | 1.57704E-04 |
| $a_{16}$ | 5.84631E-01 | -6.42315E-02 | 5.19955E-05 | -5.35948E-04 | -4.85322E-06 | -6.80021E-06 |
| $a_{18}$ | -8.16225E-02 | 2.62959E-02 | -1.51259E-05 | 2.61521E-05 | 0.00000E+00 | 0.00000E+00 |
| $a_{20}$ | 0.00000E+00 | -3.31552E-03 | 0.00000E+00 | 0.00000E+00 | 0.00000E+00 | 0.00000E+00 |

FIG. 17

| f(Focus)= 3.699mm, HFOV(Half angular field of view)= 38.966deg., Fno= 2.1, Image height= 3.05mm, System length= 4.64mm ||||||||
|---|---|---|---|---|---|---|---|
| Surface # | | Radius | Thickness | Refractive index | Abbe number | Focus | Material |
| - | Object | ∞ | ∞ | | | | |
| 500 | Aperture stop | ∞ | -0.2803 | | | | |
| 511 | 1st lens element | 1.5599 | 0.4699_T1 | 1.546_n1 | 56.114_v1 | 3.369_f1 | plastic |
| 512 | | 9.1661 | 0.0757_G12 | | | | |
| 521 | 2nd lens element | 2.8192 | 0.2477_T2 | 1.647_n2 | 22.440_v2 | -7.313_f2 | plastic |
| 522 | | 1.7056 | 0.4039_G23 | | | | |
| 531 | 3rd lens element | 42.3821 | 0.5172_T3 | 1.546_n3 | 56.114_v3 | 4.426_f3 | plastic |
| 532 | | -2.5514 | 0.2862_G34 | | | | |
| 541 | 4th lens element | -1.0870 | 0.3705_T4 | 1.647_n4 | 22.440_v4 | -5.304_f4 | plastic |
| 542 | | -1.8039 | 0.0800_G45 | | | | |
| 551 | 5th lens element | 2.4137 | 0.5211_T5 | 1.546_n5 | 56.114_v5 | 3.218_f5 | plastic |
| 552 | | -5.9653 | 0.2865_G56 | | | | |
| 561 | 6th lens element | -3.8119 | 0.5221_T6 | 1.546_n6 | 56.114_v6 | -2.362_f6 | plastic |
| 562 | | 2.0438 | 0.4000_G6F | | | | |
| 571 | IR cut filter | ∞ | 0.3000_TF | 1.518 | 64.166 | | glass |
| 572 | | ∞ | 0.1582_GFP | | | | |
| 580 | Image plane | ∞ | | | | | |

FIG. 20

| Aspherical parameters | | | | | | |
|---|---|---|---|---|---|---|
| Surface # | 511 | 512 | 521 | 522 | 531 | 532 |
| K | 0.00000E+00 | 0.00000E+00 | 0.00000E+00 | 0.00000E+00 | 0.00000E+00 | 6.12607E-01 |
| $a_4$ | 7.89211E-03 | -1.45358E-01 | -2.98713E-01 | -1.82714E-01 | -6.80075E-02 | 3.51090E-04 |
| $a_6$ | 2.49703E-02 | 3.68992E-01 | 5.19469E-01 | 2.77575E-01 | -2.21040E-01 | -2.00478E-01 |
| $a_8$ | -3.43233E-02 | -5.32949E-01 | -6.63515E-01 | -2.61341E-01 | 5.86162E-01 | -1.15808E-01 |
| $a_{10}$ | 3.99931E-02 | 4.60697E-01 | 5.65531E-01 | 2.32148E-01 | -1.09309E+00 | 1.09153E+00 |
| $a_{12}$ | -9.57875E-03 | -1.79303E-01 | -2.44708E-01 | -7.51593E-02 | 9.67886E-01 | -2.05875E+00 |
| $a_{14}$ | 0.00000E+00 | 0.00000E+00 | -8.06762E-04 | 1.06629E-03 | -2.86178E-01 | 1.94238E+00 |
| $a_{16}$ | 0.00000E+00 | 0.00000E+00 | 0.00000E+00 | 0.00000E+00 | 5.19765E-03 | -9.25334E-01 |
| $a_{18}$ | 0.00000E+00 | 0.00000E+00 | 0.00000E+00 | 0.00000E+00 | 0.00000E+00 | 1.75702E-01 |
| $a_{20}$ | 0.00000E+00 | 0.00000E+00 | 0.00000E+00 | 0.00000E+00 | 0.00000E+00 | 0.00000E+00 |
| Surface # | 541 | 542 | 551 | 552 | 561 | 562 |
| K | -1.00000E+00 | -1.00000E+00 | 0.00000E+00 | 0.00000E+00 | 0.00000E+00 | -1.00000E+00 |
| $a_4$ | 5.21063E-01 | 1.24487E-01 | -2.94037E-01 | 6.80460E-03 | -9.55079E-02 | -1.82167E-01 |
| $a_6$ | -1.57253E+00 | -5.39047E-01 | 2.58211E-01 | 6.94287E-02 | 5.94649E-02 | 8.82413E-02 |
| $a_8$ | 3.16163E+00 | 9.93985E-01 | -2.05533E-01 | -1.09748E-01 | -1.70809E-02 | -3.37384E-02 |
| $a_{10}$ | -3.99116E+00 | -8.96779E-01 | 8.84681E-02 | 6.90812E-02 | 4.14955E-03 | 8.90008E-03 |
| $a_{12}$ | 3.37348E+00 | 4.02407E-01 | -2.12476E-02 | -2.38531E-02 | -8.18599E-04 | -1.55695E-03 |
| $a_{14}$ | -1.84536E+00 | -1.98018E-02 | 2.38905E-03 | 4.79248E-03 | 9.77263E-05 | 1.57925E-04 |
| $a_{16}$ | 5.84834E-01 | -6.42502E-02 | 1.74708E-04 | -5.33109E-04 | -4.90448E-06 | -6.75099E-06 |
| $a_{18}$ | -8.22014E-02 | 2.68804E-02 | -9.65347E-05 | 2.53105E-05 | 0.00000E+00 | 0.00000E+00 |
| $a_{20}$ | 0.00000E+00 | -3.32341E-03 | 0.00000E+00 | 0.00000E+00 | 0.00000E+00 | 0.00000E+00 |

FIG. 21

| f(Focus)= 4.023mm, HFOV(Half angular field of view)= 36.632deg., Fno= 2.1, Image height= 3.05mm, System length= 4.91mm ||||||||
|---|---|---|---|---|---|---|---|
| Surface # | | Radius | Thickness | Refractive index | Abbe number | Focus | Material |
| - | Object | ∞ | ∞ | | | | |
| 600 | Aperture stop | ∞ | -0.3298 | | | | |
| 611 | 1st lens element | 1.5850 | 0.5948_T1 | 1.546_n1 | 56.114_v1 | 3.427_f1 | plastic |
| 612 | | 8.9954 | 0.0796_G12 | | | | |
| 621 | 2nd lens element | 2.8442 | 0.2536_T2 | 1.647_n2 | 22.440_v2 | -7.551_f2 | plastic |
| 622 | | 1.7347 | 0.4883_G23 | | | | |
| 631 | 3rd lens element | -60.2548 | 0.3849_T3 | 1.546_n3 | 56.114_v3 | 7.215_f3 | plastic |
| 632 | | -3.7059 | 0.3059_G34 | | | | |
| 641 | 4th lens element | -1.0646 | 0.3023_T4 | 1.647_n4 | 22.440_v4 | -6.658_f4 | plastic |
| 642 | | -1.5718 | 0.0800_G45 | | | | |
| 651 | 5th lens element | 2.4798 | 0.5781_T5 | 1.546_n5 | 56.114_v5 | 2.863_f5 | plastic |
| 652 | | -3.8797 | 0.1466_G56 | | | | |
| 661 | 6th lens element | -4.7098 | 0.5765_T6 | 1.546_n6 | 56.114_v6 | -2.575_f6 | plastic |
| 662 | | 2.0907 | 0.4789_G6F | | | | |
| 671 | IR cut filter | ∞ | 0.3000_TF | 1.518 | 64.166 | | glass |
| 672 | | ∞ | 0.3404_GFP | | | | |
| 680 | Image plane | ∞ | | | | | |

FIG. 24

| Aspherical parameters | | | | | | |
|---|---|---|---|---|---|---|
| Surface # | 611 | 612 | 621 | 622 | 631 | 632 |
| K | 0.00000E+00 | 0.00000E+00 | 0.00000E+00 | 0.00000E+00 | 0.00000E+00 | 6.12607E-01 |
| $a_4$ | 3.81500E-03 | -1.48909E-01 | -2.96771E-01 | -1.83571E-01 | -9.40347E-02 | -2.58774E-02 |
| $a_6$ | 2.34501E-02 | 3.66584E-01 | 5.16256E-01 | 2.72994E-01 | -2.32474E-01 | -1.94023E-01 |
| $a_8$ | -3.69795E-02 | -5.35744E-01 | -6.61683E-01 | -2.62312E-01 | 5.89476E-01 | -1.19478E-01 |
| $a_{10}$ | 3.67011E-02 | 4.63469E-01 | 5.69553E-01 | 2.29182E-01 | -1.08773E+00 | 1.09257E+00 |
| $a_{12}$ | -1.04520E-02 | -1.73484E-01 | -2.32400E-01 | -7.28055E-02 | 9.72271E-01 | -2.05583E+00 |
| $a_{14}$ | 0.00000E+00 | 0.00000E+00 | 0.00000E+00 | 0.00000E+00 | -2.88451E-01 | 1.94451E+00 |
| $a_{16}$ | 0.00000E+00 | 0.00000E+00 | 0.00000E+00 | 0.00000E+00 | 1.14044E-03 | -9.24338E-01 |
| $a_{18}$ | 0.00000E+00 | 0.00000E+00 | 0.00000E+00 | 0.00000E+00 | 0.00000E+00 | 1.75097E-01 |
| $a_{20}$ | 0.00000E+00 | 0.00000E+00 | 0.00000E+00 | 0.00000E+00 | 0.00000E+00 | 0.00000E+00 |
| Surface # | 641 | 642 | 651 | 652 | 661 | 662 |
| K | -1.00000E+00 | -1.00000E+00 | 0.00000E+00 | 0.00000E+00 | 0.00000E+00 | -1.00000E+00 |
| $a_4$ | 5.44051E-01 | 1.36076E-01 | -2.83752E-01 | 1.99033E-02 | -9.88757E-02 | -1.84796E-01 |
| $a_6$ | -1.56964E+00 | -5.38286E-01 | 2.64865E-01 | 6.57870E-02 | 5.92015E-02 | 8.84610E-02 |
| $a_8$ | 3.15706E+00 | 9.94932E-01 | -2.14612E-01 | -1.09918E-01 | -1.70883E-02 | -3.37256E-02 |
| $a_{10}$ | -3.99338E+00 | -8.97033E-01 | 9.16682E-02 | 6.92577E-02 | 4.15116E-03 | 8.90692E-03 |
| $a_{12}$ | 3.37322E+00 | 4.02197E-01 | -2.05364E-02 | -2.38160E-02 | -8.18145E-04 | -1.55625E-03 |
| $a_{14}$ | -1.84496E+00 | -1.98714E-02 | 2.01920E-03 | 4.79212E-03 | 9.77726E-05 | 1.57894E-04 |
| $a_{16}$ | 5.85262E-01 | -6.42624E-02 | 5.91104E-05 | -5.34692E-04 | -4.91213E-06 | -6.78252E-06 |
| $a_{18}$ | -8.19010E-02 | 2.62847E-02 | -2.90007E-05 | 2.49819E-05 | 0.00000E+00 | 0.00000E+00 |
| $a_{20}$ | 0.00000E+00 | -3.31790E-03 | 0.00000E+00 | 0.00000E+00 | 0.00000E+00 | 0.00000E+00 |

FIG. 25

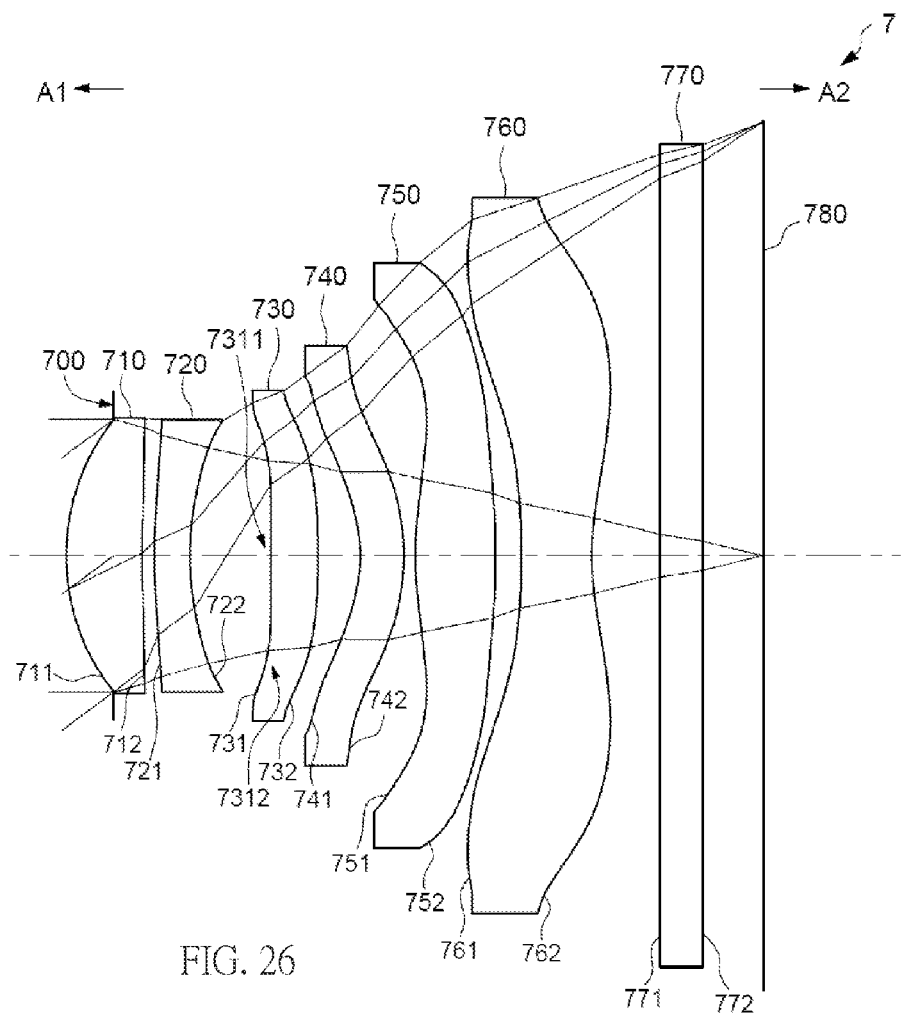
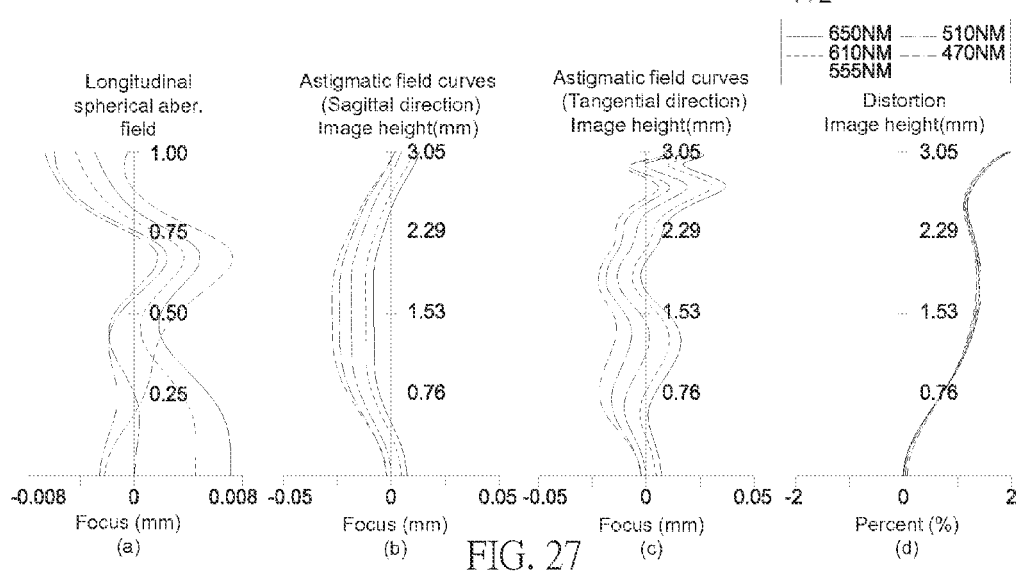
FIG. 27

| f(Focus)= 4.018mm, HFOV(Half angular field of view)= 36.664deg., Fno= 2.1, Image height= 3.05mm, System length= 4.89mm ||||||||
|---|---|---|---|---|---|---|---|
| Surface # | | Radius | Thickness | Refractive index | Abbe number | Focus | Material |
| -- | Object | ∞ | ∞ | | | | |
| 700 | Aperture stop | ∞ | -0.3321 | | | | |
| 711 | 1st lens element | 1.5813 | 0.5331_T1 | 1.546_n1 | 56.114_v1 | 3.350_f1 | plastic |
| 712 | | 10.2843 | 0.0838_G12 | | | | |
| 721 | 2nd lens element | 3.4566 | 0.2493_T2 | 1.647_n2 | 22.440_v2 | -7.303_f2 | plastic |
| 722 | | 1.9397 | 0.5722_G23 | | | | |
| 731 | 3rd lens element | 39.0321 | 0.3269_T3 | 1.546_n3 | 56.114_v3 | 8.594_f3 | plastic |
| 732 | | -5.3179 | 0.2954_G34 | | | | |
| 741 | 4th lens element | -1.0531 | 0.3068_T4 | 1.647_n4 | 22.440_v4 | -6.840_f4 | plastic |
| 742 | | -1.5400 | 0.0800_G45 | | | | |
| 751 | 5th lens element | 2.2747 | 0.5642_T5 | 1.546_n5 | 56.114_v5 | 2.902_f5 | plastic |
| 752 | | -4.7670 | 0.1792_G56 | | | | |
| 761 | 6th lens element | -7.3274 | 0.4950_T6 | 1.546_n6 | 56.114_v6 | -2.837_f6 | plastic |
| 762 | | 2.0115 | 0.4789_G6F | | | | |
| 771 | IR cut filter | ∞ | 0.3000_TF | 1.518 | 64.166 | | glass |
| 772 | | ∞ | 0.4247_GFP | | | | |
| 780 | Image plane | ∞ | | | | | |

FIG. 28

| Aspherical parameters | | | | | | |
|---|---|---|---|---|---|---|
| Surface # | 711 | 712 | 721 | 722 | 731 | 732 |
| K | 0.00000E+00 | 0.00000E+00 | 0.00000E+00 | 0.00000E+00 | 0.00000E+00 | 6.12607E-01 |
| $a_4$ | 3.99521E-03 | -1.48246E-01 | -2.90547E-01 | -1.73943E-01 | -9.68008E-02 | -2.63716E-02 |
| $a_6$ | 2.49431E-02 | 3.65451E-01 | 5.20921E-01 | 2.82636E-01 | -2.27146E-01 | -1.87986E-01 |
| $a_8$ | -3.68375E-02 | -5.38232E-01 | -6.65547E-01 | -2.69135E-01 | 5.99540E-01 | -1.16050E-01 |
| $a_{10}$ | 3.87588E-02 | 4.63449E-01 | 5.60258E-01 | 2.18598E-01 | -1.08307E+00 | 1.09296E+00 |
| $a_{12}$ | -1.15789E-02 | -1.71115E-01 | -2.28930E-01 | -7.18579E-02 | 9.75094E-01 | -2.05473E+00 |
| $a_{14}$ | 0.00000E+00 | 0.00000E+00 | 8.09342E-03 | 9.82064E-03 | -2.96063E-01 | 1.94557E+00 |
| $a_{16}$ | 0.00000E+00 | 0.00000E+00 | 0.00000E+00 | 0.00000E+00 | -3.01584E-03 | -9.23531E-01 |
| $a_{18}$ | 0.00000E+00 | 0.00000E+00 | 0.00000E+00 | 0.00000E+00 | 0.00000E+00 | 1.75600E-01 |
| $a_{20}$ | 0.00000E+00 | 0.00000E+00 | 0.00000E+00 | 0.00000E+00 | 0.00000E+00 | 0.00000E+00 |
| Surface # | 741 | 742 | 751 | 752 | 761 | 762 |
| K | -1.00000E+00 | -1.00000E+00 | 0.00000E+00 | 0.00000E+00 | 0.00000E+00 | -1.00000E+00 |
| $a_4$ | 5.49496E-01 | 1.31557E-01 | -2.80640E-01 | 3.09389E-02 | -1.03068E-01 | -1.90308E-01 |
| $a_6$ | -1.56852E+00 | -5.39831E-01 | 2.66508E-01 | 6.61467E-02 | 5.87189E-02 | 8.92142E-02 |
| $a_8$ | 3.15451E+00 | 9.96289E-01 | -2.13195E-01 | -1.10197E-01 | -1.71337E-02 | -3.37149E-02 |
| $a_{10}$ | -3.99375E+00 | -8.96652E-01 | 9.19641E-02 | 6.92029E-02 | 4.14773E-03 | 8.90267E-03 |
| $a_{12}$ | 3.37365E+00 | 4.02268E-01 | -2.06977E-02 | -2.38126E-02 | -8.18082E-04 | -1.55676E-03 |
| $a_{14}$ | -1.84455E+00 | -1.98639E-02 | 1.97438E-03 | 4.79231E-03 | 9.79098E-05 | 1.57882E-04 |
| $a_{16}$ | 5.85384E-01 | -6.42652E-02 | 6.95520E-05 | -5.34304E-04 | -4.86254E-06 | -6.76951E-06 |
| $a_{18}$ | -8.20333E-02 | 2.62787E-02 | -2.37571E-05 | 2.53220E-05 | 0.00000E+00 | 0.00000E+00 |
| $a_{20}$ | 0.00000E+00 | -3.32124E-03 | 0.00000E+00 | 0.00000E+00 | 0.00000E+00 | 0.00000E+00 |

FIG. 29

| \multicolumn{7}{c|}{f(Focus)= 3.936mm, HFOV(Half angular field of view)= 37.233deg., Fno= 2.1, Image height= 3.05mm, System length= 4.81mm} |
|---|---|---|---|---|---|---|---|
| Surface # | | Radius | Thickness | Refractive index | Abbe number | Focus | Material |
| - | Object | ∞ | ∞ | | | | |
| 800 | Aperture stop | ∞ | -0.3043 | | | | |
| 811 | 1st lens element | 1.6384 | 0.5011_T1 | 1.546_n1 | 56.114_v1 | 3.492_f1 | plastic |
| 812 | | 10.3866 | 0.0873_G12 | | | | |
| 821 | 2nd lens element | 3.7327 | 0.3049_T2 | 1.647_n2 | 22.440_v2 | -7.252_f2 | plastic |
| 822 | | 2.0122 | 0.4323_G23 | | | | |
| 831 | 3rd lens element | -59.9959 | 0.5232_T3 | 1.546_n3 | 56.114_v3 | 5.476_f3 | plastic |
| 832 | | -2.8569 | 0.3287_G34 | | | | |
| 841 | 4th lens element | -1.0330 | 0.2883_T4 | 1.647_n4 | 22.440_v4 | -6.532_f4 | plastic |
| 842 | | -1.5171 | 0.1107_G45 | | | | |
| 851 | 5th lens element | 2.2023 | 0.4352_T5 | 1.546_n5 | 56.114_v5 | 3.269_f5 | plastic |
| 852 | | -8.7563 | 0.3066_G56 | | | | |
| 861 | 6th lens element | -4.8749 | 0.3923_T6 | 1.546_n6 | 56.114_v6 | -2.708_f6 | plastic |
| 862 | | 2.1829 | 0.4789_G6F | | | | |
| 871 | IR cut filter | ∞ | 0.3000_TF | 1.518 | 64.166 | | glass |
| 872 | | ∞ | 0.3184_GFP | | | | |
| 880 | Image plane | ∞ | | | | | |

FIG. 32

| Aspherical parameters | | | | | | |
|---|---|---|---|---|---|---|
| Surface # | 811 | 812 | 821 | 822 | 831 | 832 |
| K | 0.00000E+00 | 0.00000E+00 | 0.00000E+00 | 0.00000E+00 | 0.00000E+00 | 6.12607E-01 |
| $a_4$ | 2.57137E-03 | -1.58972E-01 | -2.89245E-01 | -1.75332E-01 | -9.13346E-02 | -2.52705E-02 |
| $a_6$ | 2.78385E-02 | 3.75955E-01 | 5.10183E-01 | 2.64594E-01 | -2.26785E-01 | -1.83259E-01 |
| $a_8$ | -3.57030E-02 | -5.33677E-01 | -6.60899E-01 | -2.73898E-01 | 5.90931E-01 | -1.18619E-01 |
| $a_{10}$ | 3.55133E-02 | 4.61275E-01 | 5.64443E-01 | 2.25047E-01 | -1.08665E+00 | 1.08880E+00 |
| $a_{12}$ | -6.65338E-03 | -1.74483E-01 | -2.31393E-01 | -6.37932E-02 | 9.68231E-01 | -2.05880E+00 |
| $a_{14}$ | 0.00000E+00 | 0.00000E+00 | 0.00000E+00 | 0.00000E+00 | -2.93800E-01 | 1.94333E+00 |
| $a_{16}$ | 0.00000E+00 | 0.00000E+00 | 0.00000E+00 | 0.00000E+00 | 3.70886E-03 | -9.24326E-01 |
| $a_{18}$ | 0.00000E+00 | 0.00000E+00 | 0.00000E+00 | 0.00000E+00 | 0.00000E+00 | 1.75577E-01 |
| $a_{20}$ | 0.00000E+00 | 0.00000E+00 | 0.00000E+00 | 0.00000E+00 | 0.00000E+00 | 0.00000E+00 |
| Surface # | 841 | 842 | 851 | 852 | 861 | 862 |
| K | -1.00000E+00 | -1.00000E+00 | 0.00000E+00 | 0.00000E+00 | 0.00000E+00 | -1.00000E+00 |
| $a_4$ | 5.45312E-01 | 1.49954E-01 | -3.00672E-01 | 4.97049E-03 | -9.93348E-02 | -1.84230E-01 |
| $a_6$ | -1.57056E+00 | -5.34659E-01 | 2.61712E-01 | 6.20455E-02 | 5.92101E-02 | 8.80352E-02 |
| $a_8$ | 3.15881E+00 | 9.94475E-01 | -2.16607E-01 | -1.09553E-01 | -1.71086E-02 | -3.36766E-02 |
| $a_{10}$ | -3.99188E+00 | -8.97479E-01 | 9.19388E-02 | 6.95274E-02 | 4.14507E-03 | 8.91758E-03 |
| $a_{12}$ | 3.37329E+00 | 4.02093E-01 | -2.07168E-02 | -2.37862E-02 | -8.19058E-04 | -1.55553E-03 |
| $a_{14}$ | -1.84534E+00 | -1.98676E-02 | 1.96284E-03 | 4.78723E-03 | 9.77599E-05 | 1.57799E-04 |
| $a_{16}$ | 5.85096E-01 | -6.42508E-02 | 7.95496E-05 | -5.36872E-04 | -4.86659E-06 | -6.82540E-06 |
| $a_{18}$ | -8.17475E-02 | 2.62901E-02 | -2.16576E-05 | 2.45250E-05 | 0.00000E+00 | 0.00000E+00 |
| $a_{20}$ | 0.00000E+00 | -3.31494E-03 | 0.00000E+00 | 0.00000E+00 | 0.00000E+00 | 0.00000E+00 |

FIG. 33

| f(Focus)= 3.642mm, HFOV(Half angular field of view)= 39.401deg., Fno= 2.1, Image height=3.05mm, System length= 4.78mm ||||||||
|---|---|---|---|---|---|---|---|
| Surface # | | Radius | Thickness | Refractive index | Abbe number | Focus | Material |
| - | Object | ∞ | ∞ | | | | |
| 900 | Aperture stop | ∞ | -0.2274 | | | | |
| 911 | 1st lens element | 1.8054 | 0.4155_T1 | 1.546_n1 | 56.114_v1 | 4.024_f1 | plastic |
| 912 | | 9.3022 | 0.0915_G12 | | | | |
| 921 | 2nd lens element | 2.6808 | 0.2576_T2 | 1.647_n2 | 22.440_v2 | -9.993_f2 | plastic |
| 922 | | 1.8235 | 0.4046_G23 | | | | |
| 931 | 3rd lens element | 22.9099 | 0.6233_T3 | 1.546_n3 | 56.114_v3 | 4.796_f3 | plastic |
| 932 | | -2.9279 | 0.2804_G34 | | | | |
| 941 | 4th lens element | -0.9824 | 0.3119_T4 | 1.647_n4 | 22.440_v4 | -5.594_f4 | plastic |
| 942 | | -1.5166 | 0.0800_G45 | | | | |
| 951 | 5th lens element | 2.1401 | 0.6142_T5 | 1.546_n5 | 56.114_v5 | 2.836_f5 | plastic |
| 952 | | -5.0366 | 0.2869_G56 | | | | |
| 961 | 6th lens element | -5.0401 | 0.3500_T6 | 1.546_n6 | 56.114_v6 | -2.551_f6 | plastic |
| 962 | | 1.9719 | 0.4789_G6F | | | | |
| 971 | IR cut filter | ∞ | 0.3000_TF | 1.518 | 64.166 | | glass |
| 972 | | ∞ | 0.2856_GFP | | | | |
| 980 | Image plane | ∞ | | | | | |

FIG. 36

| Aspherical parameters | | | | | | |
|---|---|---|---|---|---|---|
| Surface # | 911 | 912 | 921 | 922 | 931 | 932 |
| K | 0.00000E+00 | 0.00000E+00 | 0.00000E+00 | 0.00000E+00 | 0.00000E+00 | 6.12607E-01 |
| $a_4$ | 4.58936E-03 | -1.48104E-01 | -3.05556E-01 | -2.09516E-01 | -6.38613E-02 | -2.00335E-02 |
| $a_6$ | 2.78507E-02 | 3.74149E-01 | 5.01428E-01 | 2.55585E-01 | -2.10059E-01 | -1.88455E-01 |
| $a_8$ | -3.18682E-02 | -5.31208E-01 | -6.58607E-01 | -2.73051E-01 | 5.82676E-01 | -1.17080E-01 |
| $a_{10}$ | 3.91009E-02 | 4.60908E-01 | 5.68003E-01 | 2.23249E-01 | -1.09793E+00 | 1.08942E+00 |
| $a_{12}$ | -7.49424E-03 | -1.77833E-01 | -2.44205E-01 | -7.73377E-02 | 9.67785E-01 | -2.06043E+00 |
| $a_{14}$ | 0.00000E+00 | 0.00000E+00 | -5.32020E-03 | 4.58565E-04 | -2.90690E-01 | 1.94174E+00 |
| $a_{16}$ | 0.00000E+00 | 0.00000E+00 | 0.00000E+00 | 0.00000E+00 | 5.62733E-04 | -9.24345E-01 |
| $a_{18}$ | 0.00000E+00 | 0.00000E+00 | 0.00000E+00 | 0.00000E+00 | 0.00000E+00 | 1.76197E-01 |
| $a_{20}$ | 0.00000E+00 | 0.00000E+00 | 0.00000E+00 | 0.00000E+00 | 0.00000E+00 | 0.00000E+00 |
| Surface # | 941 | 942 | 951 | 952 | 961 | 962 |
| K | -1.00000E+00 | -1.00000E+00 | 0.00000E+00 | 0.00000E+00 | 0.00000E+00 | -1.00000E+00 |
| $a_4$ | 5.42419E-01 | 1.54288E-01 | -2.79505E-01 | 2.95083E-02 | -1.00860E-01 | -1.86295E-01 |
| $a_6$ | -1.56958E+00 | -5.35473E-01 | 2.56848E-01 | 6.73244E-02 | 5.91087E-02 | 8.91813E-02 |
| $a_8$ | 3.16020E+00 | 9.94340E-01 | -2.11125E-01 | -1.10103E-01 | -1.70968E-02 | -3.37578E-02 |
| $a_{10}$ | -3.99131E+00 | -8.97458E-01 | 9.18096E-02 | 6.91690E-02 | 4.14961E-03 | 8.89858E-03 |
| $a_{12}$ | 3.37363E+00 | 4.02053E-01 | -2.09631E-02 | -2.38337E-02 | -8.18363E-04 | -1.55699E-03 |
| $a_{14}$ | -1.84527E+00 | -1.99074E-02 | 1.92263E-03 | 4.79135E-03 | 9.77803E-05 | 1.57863E-04 |
| $a_{16}$ | 5.84920E-01 | -6.42676E-02 | 6.98582E-05 | -5.33621E-04 | -4.89817E-06 | -6.77294E-06 |
| $a_{18}$ | -8.20372E-02 | 2.62937E-02 | -2.08850E-05 | 2.55675E-05 | 0.00000E+00 | 0.00000E+00 |
| $a_{20}$ | 0.00000E+00 | -3.30698E-03 | 0.00000E+00 | 0.00000E+00 | 0.00000E+00 | 0.00000E+00 |

FIG. 37

| Embodiment | 1st Embodiment | 2nd Embodiment | 3rd Embodiment | 4th Embodiment | 5th Embodiment | 6th Embodiment | 7th Embodiment | 8th Embodiment | 9th Embodiment |
|---|---|---|---|---|---|---|---|---|---|
| G23/G56 | 3.089 | 2.028 | 6.445 | 6.514 | 1.410 | 3.330 | 3.193 | 1.410 | 1.410 |
| TTL/T4 | 16.874 | 16.657 | 18.928 | 18.391 | 12.521 | 16.244 | 15.937 | 16.676 | 15.327 |
| T3/T4 | 1.950 | 1.911 | 2.277 | 2.093 | 1.396 | 1.273 | 1.065 | 1.815 | 1.998 |
| TTL/T6 | 9.018 | 8.535 | 8.154 | 8.339 | 8.886 | 8.517 | 9.878 | 12.257 | 13.658 |
| ALT/T2 | 11.850 | 10.002 | 11.378 | 10.977 | 10.692 | 10.608 | 9.929 | 8.020 | 9.985 |
| TTL/T5 | 8.612 | 14.907 | 11.230 | 12.942 | 8.903 | 8.493 | 8.667 | 11.047 | 7.783 |
| TTL/T1 | 8.279 | 8.974 | 9.221 | 10.040 | 9.872 | 8.254 | 9.172 | 9.594 | 11.506 |
| TTL/T4 | 16.874 | 16.657 | 18.928 | 18.391 | 12.521 | 16.244 | 15.937 | 16.676 | 15.327 |
| BFL/T4 | 3.785 | 3.918 | 5.173 | 5.299 | 2.316 | 3.703 | 3.923 | 3.806 | 3.413 |
| ALT/T3 | 4.939 | 4.555 | 4.496 | 4.495 | 5.121 | 6.990 | 7.572 | 4.673 | 4.127 |
| TTL/T3 | 8.654 | 8.715 | 8.313 | 8.786 | 8.970 | 12.758 | 14.957 | 9.190 | 7.670 |
| Gaa/T4 | 3.457 | 4.032 | 3.519 | 3.684 | 3.056 | 3.641 | 3.946 | 4.390 | 3.666 |
| BFL/T1 | 1.857 | 2.111 | 2.520 | 2.892 | 1.826 | 1.882 | 2.258 | 2.190 | 2.562 |
| T1/T2 | 2.508 | 2.132 | 2.282 | 2.137 | 1.897 | 2.346 | 2.138 | 1.644 | 1.613 |
| ALT/T1 | 4.725 | 4.691 | 4.987 | 5.136 | 5.636 | 4.523 | 4.643 | 4.879 | 6.191 |
| Gaa/T3 | 1.773 | 2.109 | 1.545 | 1.760 | 2.189 | 2.859 | 3.703 | 2.419 | 1.835 |
| G23/T4 | 1.491 | 1.544 | 1.692 | 1.802 | 1.090 | 1.615 | 1.865 | 1.499 | 1.297 |
| TTL/G23 | 11.319 | 10.786 | 11.188 | 10.206 | 11.485 | 10.055 | 8.545 | 11.122 | 11.816 |
| TTL/G34 | 17.547 | 14.687 | 19.155 | 18.693 | 16.211 | 16.050 | 16.554 | 14.628 | 17.047 |
| Gaa/T2 | 4.254 | 4.631 | 3.911 | 4.298 | 4.571 | 4.339 | 4.856 | 4.151 | 4.438 |
| TTL | 4.983 | 4.850 | 5.300 | 5.149 | 4.639 | 4.910 | 4.889 | 4.808 | 4.780 |
| ALT | 2.844 | 2.535 | 2.866 | 2.634 | 2.649 | 2.690 | 2.475 | 2.445 | 2.572 |
| Gaa | 1.021 | 1.174 | 0.985 | 1.031 | 1.132 | 1.100 | 1.211 | 1.266 | 1.143 |
| BFL | 1.118 | 1.141 | 1.448 | 1.484 | 0.858 | 1.119 | 1.204 | 1.097 | 1.065 |

FIG. 38

MOBILE DEVICE AND OPTICAL IMAGING LENS THEREOF

INCORPORATION BY REFERENCE

This application claims priority from Taiwan Patent Application No. 103120878, filed on Jun. 17, 2014, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having six lens elements and an optical imaging lens thereof.

BACKGROUND

The ever-increasing demand for smaller sized mobile devices, such as cell phones, digital cameras, etc. correspondingly triggered a growing need for a smaller sized photography module, comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

The length of conventional optical imaging lenses comprising four lens elements can be limited in a certain range; however, as the more and more demands in the market for high-end products, high-standard optical imaging lenses which show great quality with more pixels are required.

The major structure of conventional optical imaging lenses is those having four lens elements which length is short due to the few lens elements; however, those having six lens elements are getting welcome in the market for its better imaging quality and more pixels which may satisfy the requirements of high-end products. Sadly, according to current technological development, such as the optical imaging lenses in U.S. Pat. Nos. 7,663,814 and 8,040,618, both of which disclosed an optical imaging lens constructed with an optical imaging lens having six lens elements, the length of the optical imaging lens, from the object-side surface of the first lens element to the image plane, exceeds 21 mm. These optical imaging lenses are too long for smaller sized mobile devices.

Therefore, there is needed to develop optical imaging lens which is capable to place with six lens elements therein, with a shorter length, while also having good optical characteristics.

SUMMARY

An object of the present invention is to provide a mobile device and an optical imaging lens thereof. With controlling the convex or concave shape of the surfaces and at least one inequality, the length of the optical imaging lens is shortened and meanwhile the good optical characteristics and system functionality are sustained.

In an exemplary embodiment, an optical imaging lens comprises, sequentially from an object side to an image side along an optical axis, comprises first, second, third, fourth, fifth and sixth lens elements, each of the first, second, third, fourth, fifth and sixth lens elements having refraction power, an object-side surface facing toward the object side and an image-side surface facing toward the image side and a central thickness defined along the optical axis.

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, an air gap between the fourth lens element and the fifth lens element along the optical axis, represented by G45, the central thickness of the fifth lens element, represented by T5, an air gap between the fifth lens element and the sixth lens element along the optical axis, represented by G56, the central thickness of the sixth lens element, represented by T6, a distance between the image-side surface of the fifth lens element and the object-side surface of a filtering unit along the optical axis, represented by G6F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, a focusing length of the sixth lens element, represented by f6, the refraction index of the first lens element, represented by n1, the refraction index of the second lens element, represented by n2, the refraction index of the third lens element, represented by n3, the refraction index of the fourth lens element, represented by n4, the refraction index of the fifth lens element, represented by n5, the refraction index of the sixth lens element, represented by n6, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an abbe number of the sixth lens element, represented by v6, an effective focal length of the optical imaging lens, represented by EFL, a distance between the object-side surface of the first lens element and an image plane along the optical axis, represented by TTL, a sum of the central thicknesses of all six lens elements, i.e. a sum of T1, T2, T3, T4, T5 and T6, represented by ALT, a sum of all five air gaps from the first lens element to the sixth lens element along the optical axis, i.e. a sum of G12, G23, G34, G45 and G56, represented by Gaa, and a back focal length of the optical imaging lens, which is defined as the distance from the image-side surface of the sixth lens element to the image plane along the optical axis, i.e. a sum of G6F, TF and GFP, and represented by BFL.

In an aspect of the present invention, in the optical imaging lens, the object-side surface of the first lens comprises a convex portion in a vicinity of the optical axis; the image-side surface of the second lens element comprises a concave portion in a vicinity of a periphery of the second lens element; the object-side surface of the third lens element comprises a concave portion in a vicinity of a periphery of the third lens element; the object-side surface of the fourth lens element comprises a concave portion in a vicinity of the optical axis; the fifth lens element has positive refraction power; the image-side surface of the sixth lens element comprises a concave portion in a vicinity of the optical axis. The optical imaging lens comprises no other lenses having refraction power beyond the six lens elements, and satisfy the equations below:

$$1.4 \leq G23/G56 \qquad \text{Equation (1)};$$

$$TTL/T4 \leq 19.0 \qquad \text{Equation (2)};$$

$$0.96 \leq T3/T4 \qquad \text{Equation(3)};$$

In another exemplary embodiment, other equation(s), such as those relating to the ratio among parameters could be taken into consideration:

TTL and T6 could be controlled to satisfy the equation as follows:

$$8.0 \leq TTL/T6 \qquad \text{Equation (4); or}$$

ALT and T2 could be controlled to satisfy the equation as follows:

$$ALT/T2 \leq 11.9 \qquad \text{Equation (5); or}$$

TTL and T5 could be controlled to satisfy the equation as follows:

$$TTL/T5 \leq 15.0 \qquad \text{Equation (6); or}$$

TTL and T1 could be controlled to satisfy the equation as follows:

$$8.6 \leq TTL/T1 \qquad \text{Equation (7); or}$$

TTL and T4 could be controlled to satisfy the equation as follows:

$$TTL/T4 \leq 19.0 \qquad \text{Equation (8); or}$$

BFL and T4 could be controlled to satisfy the equation as follows:

$$2.3 \leq BFL/T4 \leq 5.3 \qquad \text{Equation (9); or}$$

ALT and T3 could be controlled to satisfy the equation as follows:

$$ALT/T3 \leq 7.0 \qquad \text{Equation (10); or}$$

TTL and T3 could be controlled to satisfy the equation as follows:

$$TTL/T3 \leq 15.0 \qquad \text{Equation (11); or}$$

Gaa and T4 could be controlled to satisfy the equation as follows:

$$2.0 \leq Gaa/T4 \leq 5.0 \qquad \text{Equation (12); or}$$

BFL and T1 could be controlled to satisfy the equation as follows:

$$1.9 \leq BFL/T1 \leq 2.9 \qquad \text{Equation (13); or}$$

T1 and T2 could be controlled to satisfy the equation as follows:

$$T1/T2 \leq 2.7 \qquad \text{Equation (14); or}$$

ALT and T1 could be controlled to satisfy the equation as follows:

$$4.3 \leq ALT/T1 \qquad \text{Equation (15); or}$$

Gaa and T3 could be controlled to satisfy the equation as follows:

$$Gaa/T3 \leq 3.0 \qquad \text{Equation (16); or}$$

G23 and T4 could be controlled to satisfy the equation as follow:

$$1.0 \leq G23/T4 \leq 2.0 \qquad \text{Equation (17); or}$$

TTL and G23 could be controlled to satisfy the equation as follow:

$$TTL/G23 \leq 12.0 \qquad \text{Equation (18); or}$$

TTL and G34 could be controlled to satisfy the equation as follow:

$$TTL/G34 \leq 25.0 \qquad \text{Equation (19); or}$$

Gaa and T2 could be controlled to satisfy the equation as follow:

$$3.5 \leq Gaa/T2 \qquad \text{Equation (20).}$$

Aforesaid exemplary embodiments are not limited and could be selectively incorporated in other embodiments described herein.

In some exemplary embodiments, more details about the convex or concave surface structure could be incorporated for one specific lens element or broadly for plural lens elements to enhance the control for the system performance and/or resolution. It is noted that the details listed here could be incorporated in example embodiments if no inconsistency occurs.

In another exemplary embodiment, a mobile device comprising a housing and a photography module positioned in the housing is provided. The photography module comprises any of aforesaid example embodiments of optical imaging lens, a lens barrel, a module housing unit and an image sensor. The lens barrel is for positioning the optical imaging lens, the module housing unit is for positioning the lens barrel, and the image sensor is positioned at the image side of the optical imaging lens.

Through controlling the convex or concave shape of the surfaces and at lease one inequality, the mobile device and the optical imaging lens thereof in exemplary embodiments achieve good optical characteristics and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 26 is a cross-sectional view of a seventh embodiment of an optical imaging lens having six lens elements according to the present disclosure;

FIG. 27 is a chart of longitudinal spherical aberration and other kinds of optical aberrations of a seventh embodiment of the optical imaging lens according to the present disclosure;

FIG. 28 is a table of optical data for each lens element of a seventh embodiment of an optical imaging lens according to the present disclosure;

FIG. 29 is a table of aspherical data of a seventh embodiment of the optical imaging lens according to the present disclosure;

FIG. 32 is a table of optical data for each lens element of the optical imaging lens of a eighth embodiment of the present disclosure;

FIG. 33 is a table of aspherical data of a eighth embodiment of the optical imaging lens according to the present disclosure;

FIG. 36 is a table of optical data for each lens element of the optical imaging lens of a ninth embodiment of the present disclosure;

FIG. 37 is a table of aspherical data of a ninth embodiment of the optical imaging lens according to the present disclosure;

FIG. 38 is a table for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of all nine example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
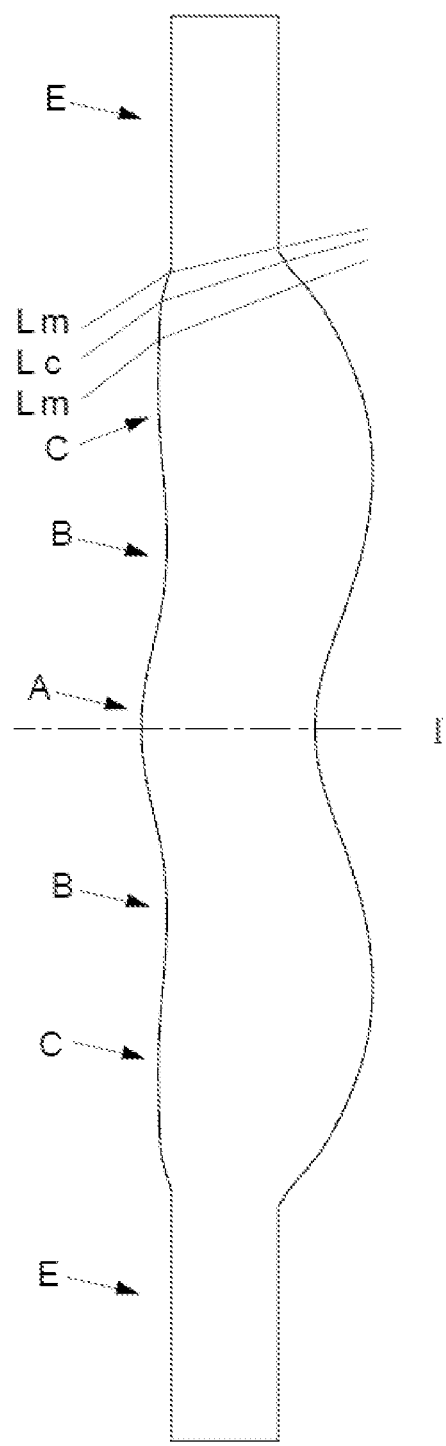
FIG. 1 is a cross-sectional view of one single lens element according to the present disclosure.

Here in the present specification, "a lens element having positive refraction power (or negative refraction power)" means that the lens element has positive refraction power (or negative refraction power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. Taking FIG. 1 for example, the lens element shown therein is radially symmetric around the optical axis which is labeled by I. The object-side surface of the lens element comprises a convex portion at region A, a concave portion at region B, and another convex portion at region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

In the present invention, examples of an optical imaging lens which is a prime lens are provided. Example embodiments of an optical imaging lens may comprise a first lens element, a second lens element, a third lens element, a fourth lens element, a fifth lens element and a sixth lens element, each of the lens elements comprises refraction power, an object-side surface facing toward an object side and an image-side surface facing toward an image side and a central thickness defined along the optical axis. These lens elements may be arranged sequentially from the object side to the image side along an optical axis, and example embodiments of the lens may comprise no other lenses having refraction power beyond the six lens elements, Through the design of detail characteristics of each lens element, the optical imaging lens thereof in exemplary embodiments achieve good optical characteristics and effectively shorten the length of the optical imaging lens.

In an example embodiment: the object-side surface of the first lens element comprises a convex portion in a vicinity of the optical axis; the image-side surface of the second lens element comprises a concave portion in a vicinity of a periphery of the second lens element; the object-side surface of the third lens element comprises a concave portion in a vicinity of a periphery of the third lens element; the object-side surface of the fourth lens element comprises a concave portion in a vicinity of the optical axis; the fifth lens element has positive refraction power; the image-side surface of the sixth lens element comprises a concave portion in a vicinity of the optical axis and satisfy the equations below:

$1.4 \leq G23/G56$      Equation (1);

$TTL/T4 \leq 19.0$      Equation (2);

$0.96 \leq T3/T4$      Equation (3);

Preferably, the lens elements are designed in light of the optical characteristics and the length of the optical imaging lens. For example, combining the convex portion in a vicinity of the optical axis formed on the object-side surface of the first lens element, the concave portion in a vicinity of the second lens element formed on the image-side surface of the second lens element, the concave portion in a vicinity of the third lens element formed on the object-side surface of the third lens element, the concave portion in a vicinity of the optical axis formed on the object-side surface of the fourth lens element, and the concave portion in a vicinity of the optical axis formed on the image-side surface of the sixth lens element, and the combination of the six lens elements may assist in collecting light, the aberration of the optical imaging lens could be adjusted to promote the imaging quality of the optical imaging lens. Further, if the aperture stop is positioned in front of the first lens element, and the fifth lens element has positive refraction power, the imaging quality is improved as the length of the optical imaging lens is shortened. When all lens elements are made by plastic material, the benefit of reduced production difficulty, cost and weight is enhanced.

Reference is now made to Equation (1)~(3), which assists in sustaining better optical characteristics and production capability. Equation (1) is used for controlling that the ratio of G23 to G56 is greater than 1.4 or equal to 1.4. Equation (2) is used for controlling that the ratio of TTL to T4 is smaller than 19.0 or equal to 19.0. Equation (3) is used for controlling that the ratio of T3 to T4 is greater than 0.96 or equal to 0.96. When G23, TTL, and T3 are invariable and G56, T4 are shortened, the reduction of the volume of the optical imaging lens can be reached to facilitate the shortening of the length of the optical imaging lens. Perfectly, if $1.4 \leq G23/G56 \leq 7.0$, $10.0 \leq TTL/T4 \leq 19.0$, and $0.96 \leq T3/T4 \leq 2.7$, the volume of the optical imaging lens can be more smaller.

In another exemplary embodiment, some equation(s) of parameters, such as those relating to the ratio among parameters could be taken into consideration.

TTL and T6 could be controlled to satisfy the equation as follows:

$8.0 \leq TTL/T6$      Equation (4); or

ALT and T2 could be controlled to satisfy the equation as follows:

$ALT/T2 \leq 11.9$      Equation (5); or

TTL and T5 could be controlled to satisfy the equation as follows:

$TTL/T5 \leq 15.0$      Equation (6); or

TTL and T1 could be controlled to satisfy the equation as follows:

$8.6 \leq TTL/T1$      Equation (7); or

TTL and T4 could be controlled to satisfy the equation as follows:

$TTL/T4 \leq 19.0$      Equation (8); or

BFL and T4 could be controlled to satisfy the equation as follows:

$2.3 \leq BFL/T4 \leq 5.3$      Equation (9); or

ALT and T3 could be controlled to satisfy the equation as follows:

$ALT/T3 \leq 7.0$      Equation (10); or

TTL and T3 could be controlled to satisfy the equation as follows:

$TTL/T3 \leq 15.0$      Equation (11); or

Gaa and T4 could be controlled to satisfy the equation as follows:

$2.0 \leq Gaa/T4 \leq 5.0$      Equation (12); or

BFL and T1 could be controlled to satisfy the equation as follows:

$$1.9 \leq BFL/T1 \leq 2.9 \quad \text{Equation (13); or}$$

T1 and T2 could be controlled to satisfy the equation as follows:

$$T1/T2 \leq 2.7 \quad \text{Equation (14); or}$$

ALT and T1 could be controlled to satisfy the equation as follows:

$$4.3 \leq ALT/T1 \quad \text{Equation (15); or}$$

Gaa and T3 could be controlled to satisfy the equation as follows:

$$Gaa/T3 \leq 3.0 \quad \text{Equation (16); or}$$

G23 and T4 could be controlled to satisfy the equation as follow:

$$1.0 \leq G23/T4 \leq 2.0 \quad \text{Equation (17); or}$$

TTL and G23 could be controlled to satisfy the equation as follow:

$$TTL/G23 \leq 12.0 \quad \text{Equation (18); or}$$

TTL and G34 could be controlled to satisfy the equation as follow:

$$TTL/G34 \leq 25.0 \quad \text{Equation (19); or}$$

Gaa and T2 could be controlled to satisfy the equation as follow:

$$3.5 \leq Gaa/T2 \quad \text{Equation (20).}$$

Aforesaid exemplary embodiments are not limited and could be selectively incorporated in other embodiments described herein.

Reference is now made to Equations (5), (6), (8), (10), (11), (14), (16), (18), and (19). Considering numerators of these equations and preventing that the value of each numerator is too great to shorten the length of the optical imaging lens. When Equations (5), (6), (8), (10), (11), (14), (16), (18), and (19) are satisfied, it means that the denominators of these equations are available and the numerators of these equations are shortened, and the reduction of volume of the optical image lens can be reached. Except the ranges listed in Equations (5), (6), (8), (10), (11), (14), (16), (18), and (19), the value of ALT/T2 is perfectly suggested to be within 7.0~11.9, the value of TTL/T5 is perfectly suggested to be within 7.0~15.0, the value of TTL/T4 is perfectly suggested to be within 11.0~19.0, the value of ALT/T3 is perfectly suggested to be within 4.0~7.0, the value of TTL/T3 is perfectly suggested to be within 7.0~15.0, the value of T1/T5 is perfectly suggested to be within 1.0~2.7, the value of Gaa/T3 is perfectly suggested to be within 1.0~3.0, and the value of TTL/G23 is perfectly suggested to be within 8.0~12.0, and the value of TTL/G34 is perfectly suggested to be within 13.0~25.0. When these ranges are all satisfied, the excellent imaging quality of the optical lens element can be arrived.

Reference is now made to Equations (4), (7), (15), (20). Considering the arrangement of each equations, preventing that the great values of the numerators of the equations increase the difficulty of manufacturing process. Moreover, when Equations (4), (7), (15), (20) are satisfied, each equation has a better value, the proper yield in the assembly process can be kept, and the excellent imaging quality can be arrived. Except the ranges listed in Equations (4), (7), (15), (20), the value of TTL/T6 is perfectly suggested to be within 8.0~13.0, the value of TTL/T1 is perfectly suggested to be within 8.6~12.0, the value of ALT/T1 is perfectly suggested to be within 4.3~7.0, and the value of Gaa/T2 is perfectly suggested to be within 3.5~6.0. When these ranges are all satisfied, the smaller volume of the optical lens element can be maintained.

In light of the unpredictability in an optical system, in the present invention, satisfying these equation listed above may preferably shortening the length of the optical imaging lens, lowering the f-number, enlarging the shot angle, promoting the imaging quality and/or increasing the yield in the assembly process.

When implementing example embodiments, more details about the convex or concave surface could be incorporated for one specific lens element or broadly for plural lens elements to enhance the control for the system performance and/or resolution, for example, the image-side surface of the sixth lens element may comprise a further convex portion in a vicinity of a periphery of the sixth lens element. It is noted that the details listed here could be incorporated in example embodiments if no inconsistency occurs.

Figure 2:
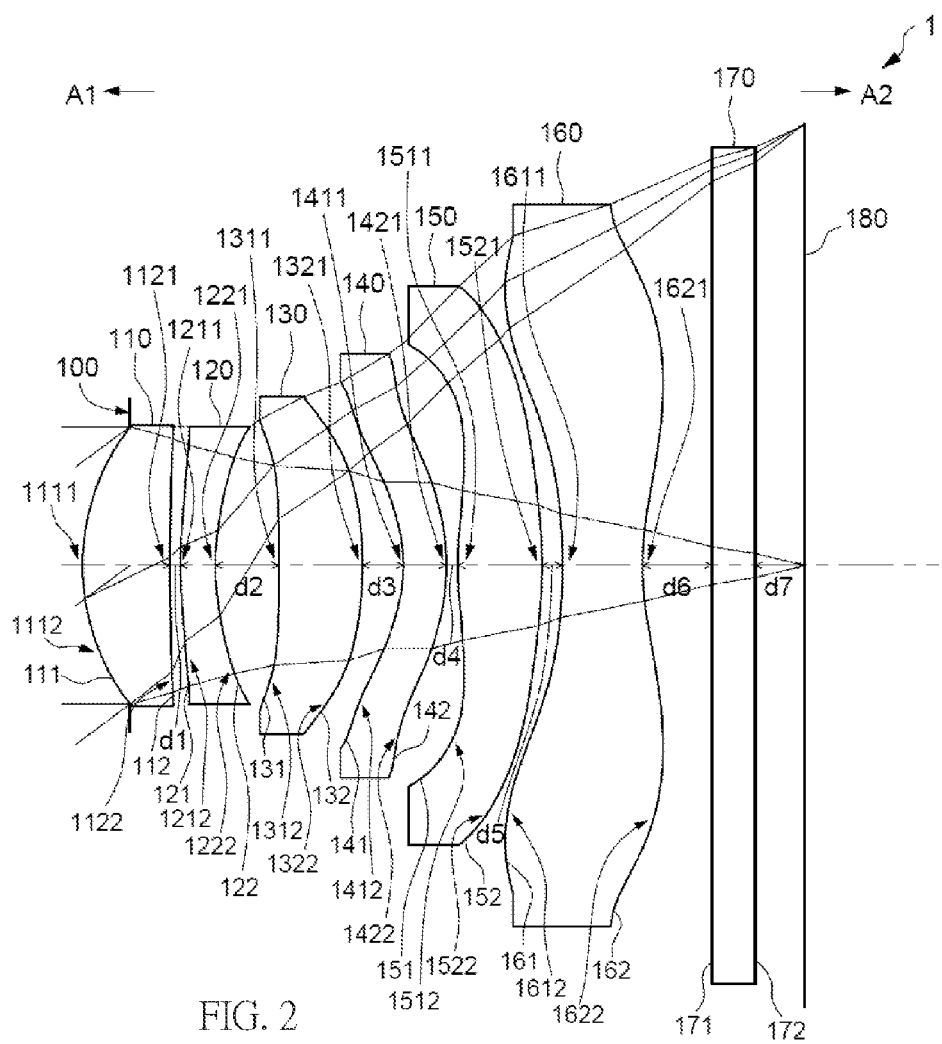
FIG. 2 is a cross-sectional view of a first embodiment of an optical imaging lens having six lens elements according to the present disclosure.
Figure 3:
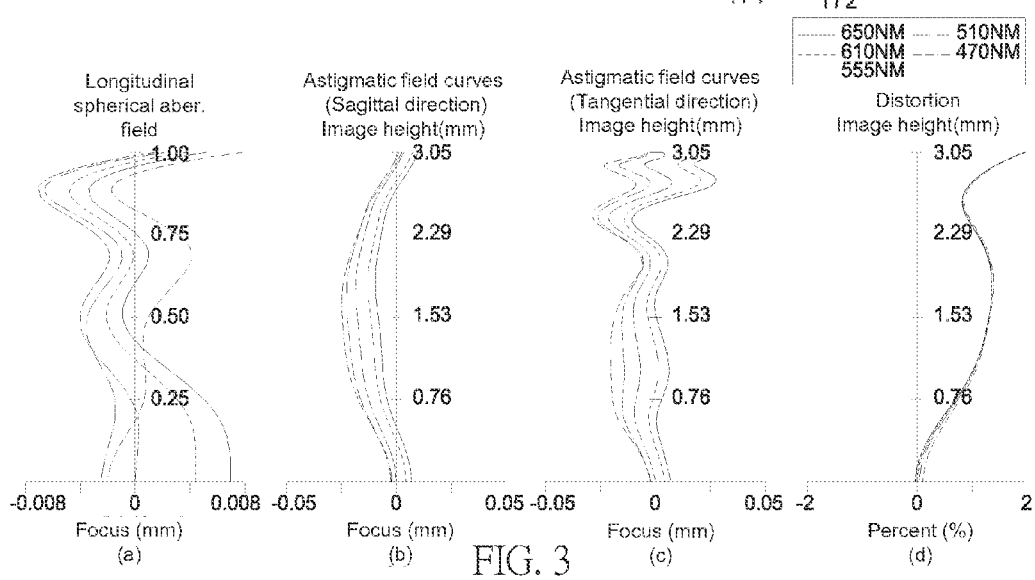
FIG. 3 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a wide angle of taking a picture. Reference is now made to FIGS. 2-5. FIG. 2 illustrates an example cross-sectional view of an optical imaging lens 1 having six lens elements of the optical imaging lens according to a first example embodiment. FIG. 3 shows example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment, in which f is used for representing EFL. FIG. 5 depicts an example table of aspherical data of the optical imaging lens 1 according to an example embodiment. As shown in FIG. 2, the optical imaging lens 1 of the present embodiment comprises, in order from an object side A1 to an image side A2 along an optical axis, an aperture stop 100, a first lens element 110, a second lens element 120, a third lens element 130, a fourth lens element 140, a fifth lens element 150 and a sixth lens element 160. A filtering unit 170 and an image plane 180 of an image sensor are positioned at the image side A2 of the optical lens 1. Each of the first, second, third, fourth, fifth, sixth lens elements 110, 120, 130, 140, 150, 160 and the filtering unit 170 comprises an object-side surface 111/121/131/141/151/161/171 facing toward the object side A1 and an image-side surface 112/122/132/142/152/162/172 facing toward the image side A2. The example embodiment of the filtering unit 170 illustrated is an IR cut filter (infrared cut filter) positioned between the sixth lens element 160 and an image plane 180. The filtering unit 170 selectively absorbs light with specific wavelength from the light passing optical imaging lens 1. For example, IR light is absorbed, and this will prohibit the IR light which is not seen by human eyes from producing an image on the image plane 180.

Please noted that during the normal operation of the optical imaging lens 1, the distance between any two adjacent lens elements of the first, second, third, fourth, fifth and sixth lens elements 110, 120, 130, 140, 150, 160 is a unchanged value, i.e. the optical imaging lens 1 is a prime lens. Exemplary embodiments of each lens element of the optical imaging lens 1 which may be constructed by plastic material will now be described with reference to the drawings.

An example embodiment of the first lens element 110 has positive refraction power. The object-side surface 111 is a convex surface comprising a convex portion 1111 in a vicinity of the optical axis and a convex portion 1112 in a vicinity of a periphery of the first lens element 110. The image-side surface 112 is a concave surface comprising a concave portion 1121 in a vicinity of the optical axis and a concave portion 1122 in a vicinity of the periphery of the first lens element 110.

An example embodiment of the second lens element 120 has negative refraction power. The object-side surface 121 is a convex surface comprising a convex portion 1211 in a vicinity of the optical axis and a convex portion 1212 in a vicinity of a periphery of the second lens element 120. The image-side surface 122 is a concave surface comprising a concave portion 1221 in a vicinity of the optical axis and a concave portion 1222 in a vicinity of the periphery of the second lens element 120.

An example embodiment of the third lens element 130 has positive refraction power. The object-side surface 131 is a concave surface comprising a concave portion 1311 in a vicinity of the optical axis, a concave portion 1312 in a vicinity of a periphery of the third lens element 130. The image-side surface 132 is a convex surface comprising a convex portion 1321 in a vicinity of the optical axis and a convex portion 1322 in a vicinity of the periphery of the third lens element 130.

An example embodiment of the fourth lens element 140 has negative refraction power. The object-side surface 141 is a concave surface comprising a concave portion 1411 in a vicinity of the optical axis and a concave portion 1412 in a vicinity of a periphery of the fourth lens element 140. The image-side surface 142 is a convex surface comprising a convex portion 1421 in a vicinity of the optical axis and a convex portion 1422 in a vicinity of the periphery of the fourth lens element 140.

An example embodiment of the fifth lens element 150 has positive refraction power. The object-side surface 151 comprises a convex portion 1511 in a vicinity of the optical axis and a concave portion 1512 in a vicinity of a periphery of the fifth lens element 150. The image-side surface 152 is a convex surface comprising a convex portion 1521 in a vicinity of the optical axis and a convex portion 1522 in a vicinity of the periphery of the fifth lens element 150.

An example embodiment of the sixth lens element 160 has negative refraction power. The object-side surface 161 comprises a concave portion 1611 in a vicinity of the optical axis and a convex portion 1612 in a vicinity of a periphery of the sixth lens element 160. The image-side surface 162 comprises a concave portion 1621 in a vicinity of the optical axis and a convex portion 1622 in a vicinity of the periphery of the sixth lens element 160.

In example embodiments, air gaps exist between the lens elements 110, 120, 130, 140, 150, 160, the filtering unit 170 and the image plane 180 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170 and the air gap d7 existing between the filtering unit 170 and the image plane 180 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G45, the air gap d5 is denoted by G56 and the sum of d1, d2, d3, d4 and d5 is denoted by Gaa.

FIG. 4 depicts the optical characteristics of each lens elements in the optical imaging lens 1 of the present embodiment, and please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 111 of the first lens element 110 to the image plane 180 along the optical axis is 4.98 mm, and the length of the optical imaging lens 1 is shortened compared with conventional optical imaging lenses. Thus, the optical imaging lens 1 is capable to provide excellent imaging quality for smaller sized mobile devices.

The aspherical surfaces, including the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160 are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_i \times Y^i$$

Wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents an aspherical coefficient of $i^{th}$ level.

The values of each aspherical parameter are shown in FIG. 5.

As illustrated in FIG. 3, longitudinal spherical aberration (a), the curves of different wavelengths are closed to each other. This represents off-axis light with respect to these wavelengths is focused around an image point. From the vertical deviation of each curve shown therein, the offset of the off-axis light relative to the image point is within ±0.01 mm. Therefore, the present embodiment improves the longitudinal spherical aberration with respect to different wavelengths.

Please refer to FIG. 3, astigmatism aberration in the sagittal direction (b) and astigmatism aberration in the tangential direction (c). The focus variation with respect to the three wavelengths in the whole field falls within ±0.05 mm. This reflects the optical imaging lens 1 of the present embodiment eliminates aberration effectively. Additionally, the closed curves represents dispersion is improved.

Please refer to FIG. 3, distortion aberration (d), which showing the variation of the distortion aberration is within ±2%.

Therefore, the optical imaging lens 1 of the present embodiment shows great characteristics in the longitudinal spherical aberration, astigmatism in the sagittal direction, astigmatism in the tangential direction, and distortion aberration. According to above illustration, the optical imaging lens 1 of the example embodiment indeed achieves great optical performance and the length of the optical imaging lens 1 is effectively shortened.

Figure 6:
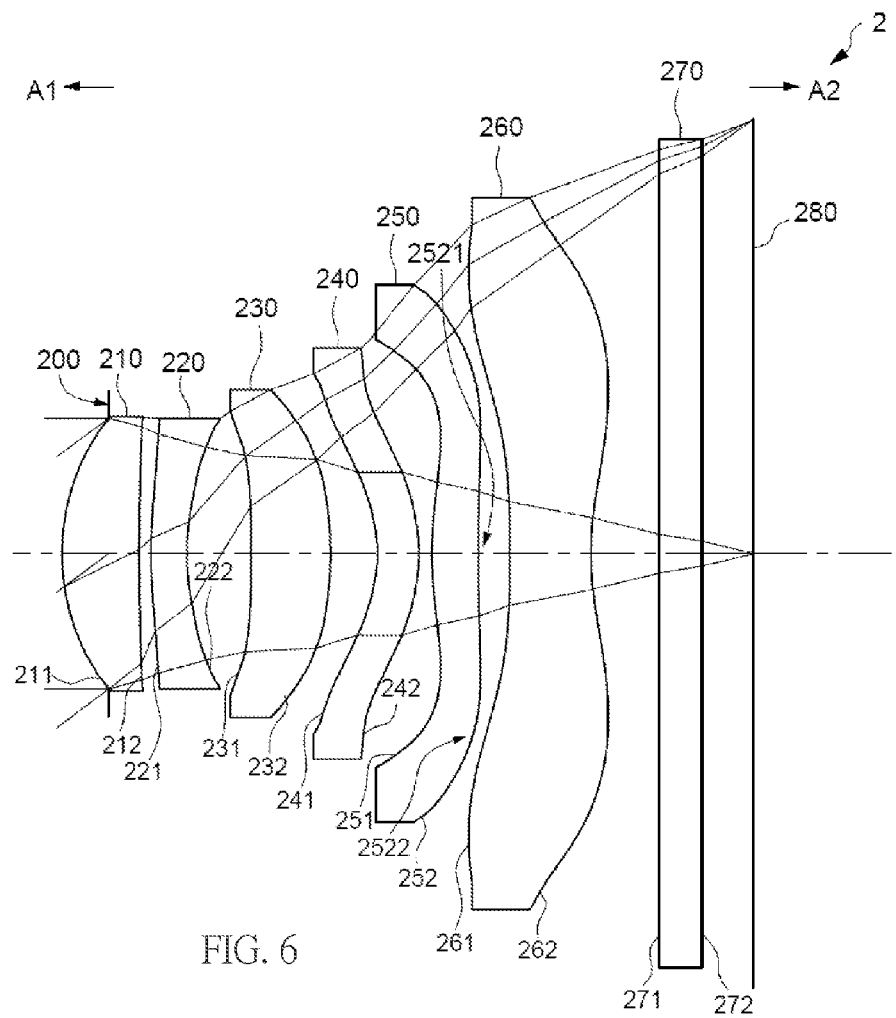
FIG. 6 is a cross-sectional view of a second embodiment of an optical imaging lens having six lens elements according to the present disclosure.
Figure 7:
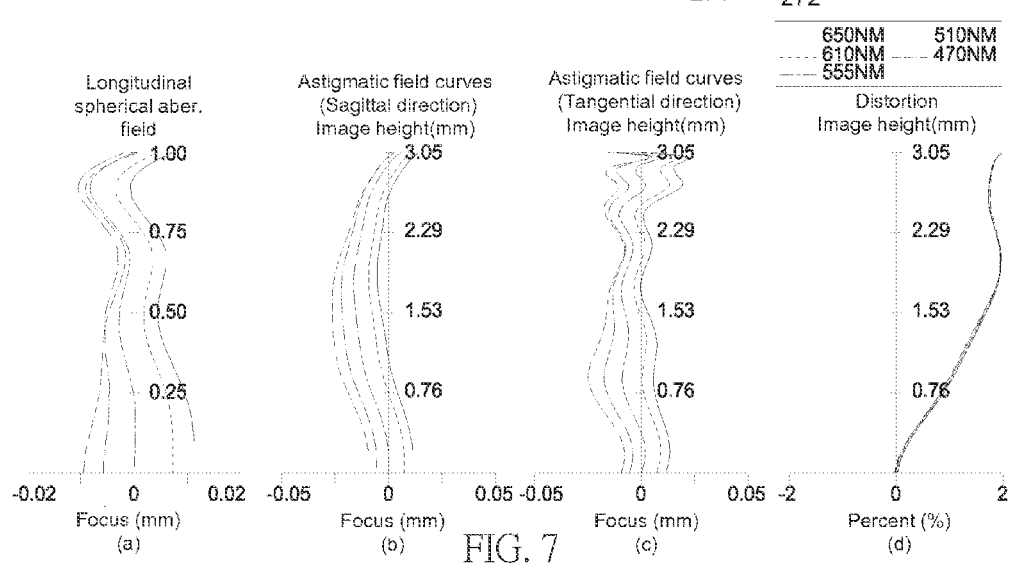
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having six lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the optical imaging lens 2 of the present embodiment, in an order from an object side A1 to an image side A2 along an optical axis, comprises an aperture stop 200, a first lens element 210, a second lens element 220, a third lens element 230, a fourth lens element 240, a fifth lens element 250 and a sixth lens element 260.

The differences between the second embodiment and the first embodiment are the radius of curvature and thickness of each lens element, the distance of each air gap, a back focal length and the configuration of the concave/convex shape of the image-side surface 252, but the configuration of the positive/negative refraction index refraction power of the first, second, third, fourth, fifth and sixth lens elements 210, 220, 230, 240, 250, 260 and configuration of the concave/convex shape of surfaces, comprising the object-side surfaces 211, 221, 231, 241, 251, 261 facing to the object side A1 and the image-side surfaces 212, 222, 232, 252, 262 facing to the image side A2, are similar to those in the first embodiment. Here, for clearly showing the drawings of the present embodiment, only the surface shapes which are different from that in the first embodiment are labeled. Specifically, the image-side surface 252 of the fifth lens element 250 comprises a concave portion 2521 in a vicinity of the optical axis and a convex portion 2522 in a vicinity of a periphery of the fifth lens element 250. Please refer to FIG. 8 for the optical characteristics of each lens elements in the optical imaging lens 2 the present embodiment, and please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 211 of the first lens element 210 to the image plane 280 along the optical axis is 4.85 mm and the length of the optical imaging lens 2 is shortened. Even the length of the optical imaging lens 2 is shorter than that of the optical imaging lens 1. Thus, the optical imaging lens 2 is capable to provide excellent imaging quality for smaller sized mobile devices.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
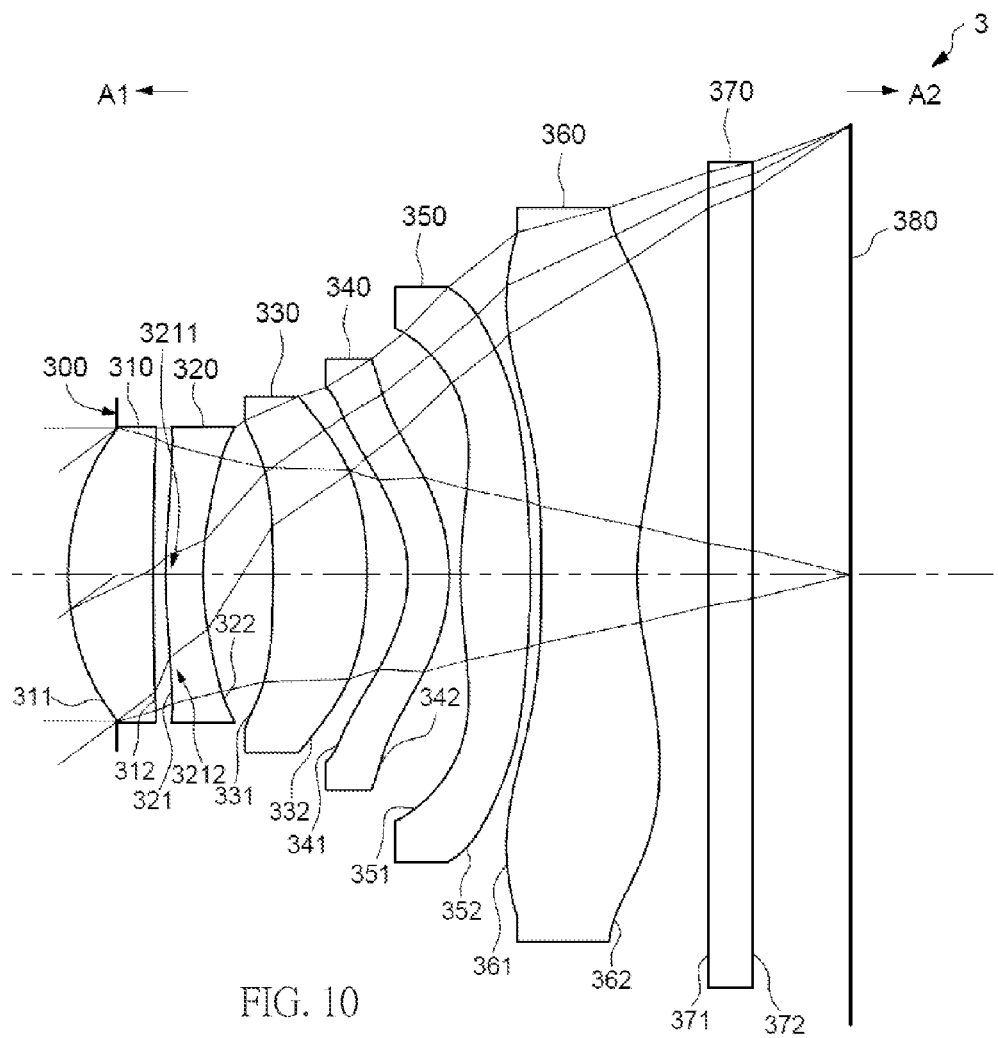
FIG. 10 is a cross-sectional view of a third embodiment of an optical imaging lens having six lens elements according to the present disclosure.
Figure 11:
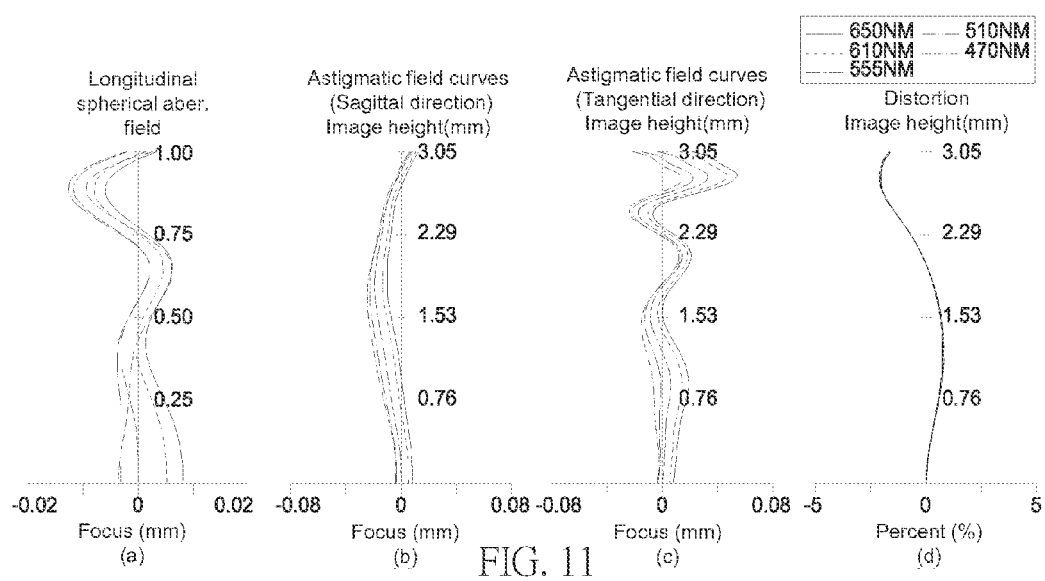
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having six lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the optical imaging lens 3 of the present embodiment, in an order from an object side A1 to an image side A2 along an optical axis, comprises an aperture stop 300, a first lens element 310, a second lens element 320, a third lens element 330, a fourth lens element 340, a fifth lens element 350 and a sixth lens element 360.

The differences between the third embodiment and the first embodiment are the radius of curvature and thickness of each lens element, the distance of each air gap, a back focal length and the configuration of the concave/convex shape of surfaces comprising the object-side surfaces 321, but the configuration of the positive/negative refraction power of the first, second, third, fourth and fifth lens elements 310, 320, 330, 340, 350 and configuration of the concave/convex shape of surfaces, comprising the object-side surfaces 311, 331, 341, 351, 361 facing to the object side A1 and the image-side surfaces 312, 322, 332, 342, 352, 362 facing to the image side A2, are similar to those in the first embodiment. Here, for clearly showing the drawings of the present embodiment, only the surface shapes which are different from that in the first embodiment are labeled. Specifically, the object-side surface 321 of the second lens element 320 comprises a convex portion 3211 in a vicinity of the optical axis and a concave portion 3212 in a vicinity of a periphery of the second lens element 320. Please refer to FIG. 12 for the optical characteristics of each lens elements in the optical imaging lens 3 of the present embodiment, and please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 311 of the first lens element 310 to the image plane 380 along the optical axis is 5.30 mm and the length of the optical imaging lens 3 is shortened compared with conventional optical imaging lenses. Thus, the optical imaging lens 3 is capable to provide excellent imaging quality for smaller sized mobile devices.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d), and the present embodiment shows a easier manufacturing process than that of the first embodiment to provide a better yield. Therefore, according to the above illustration, the optical imaging lens of the present embodiment indeed shows great optical performance and the length of the optical imaging lens 3 is effectively shortened.

Figure 14:
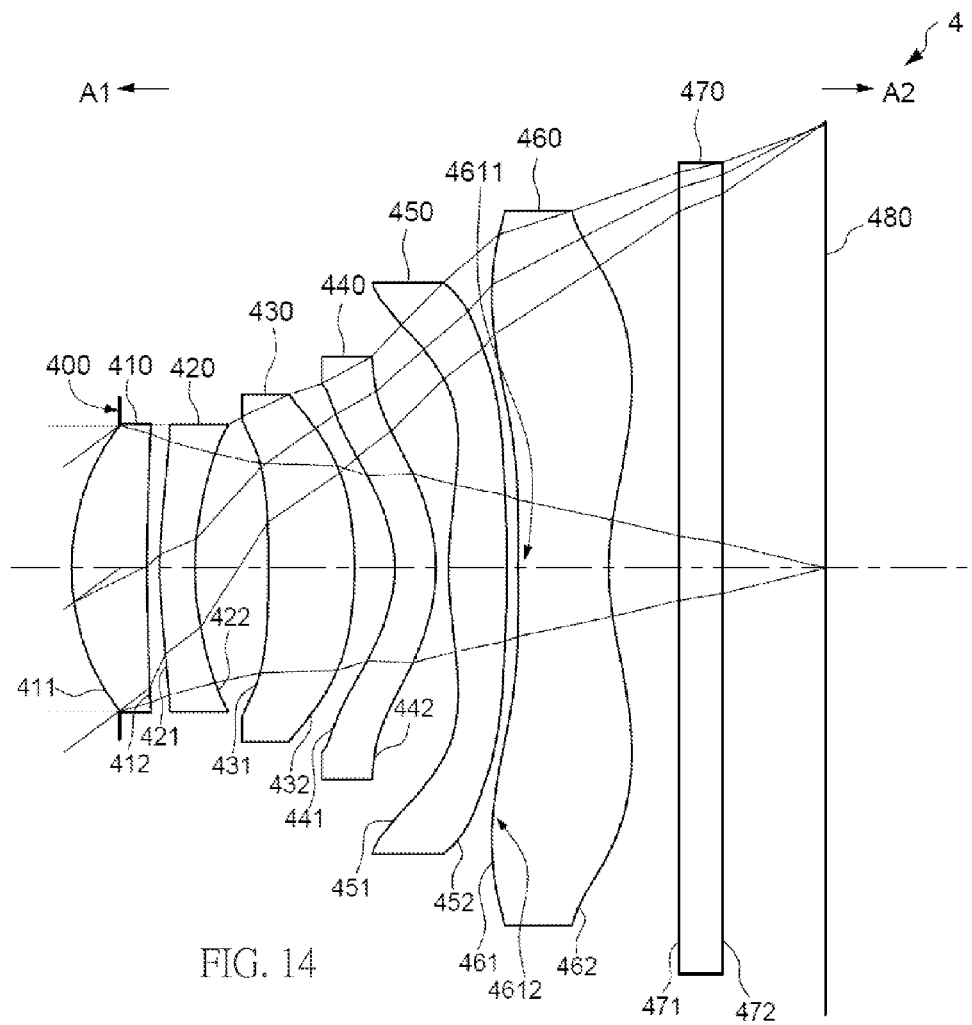
FIG. 14 is a cross-sectional view of a fourth embodiment of an optical imaging lens having six lens elements according to the present disclosure.
Figure 15:
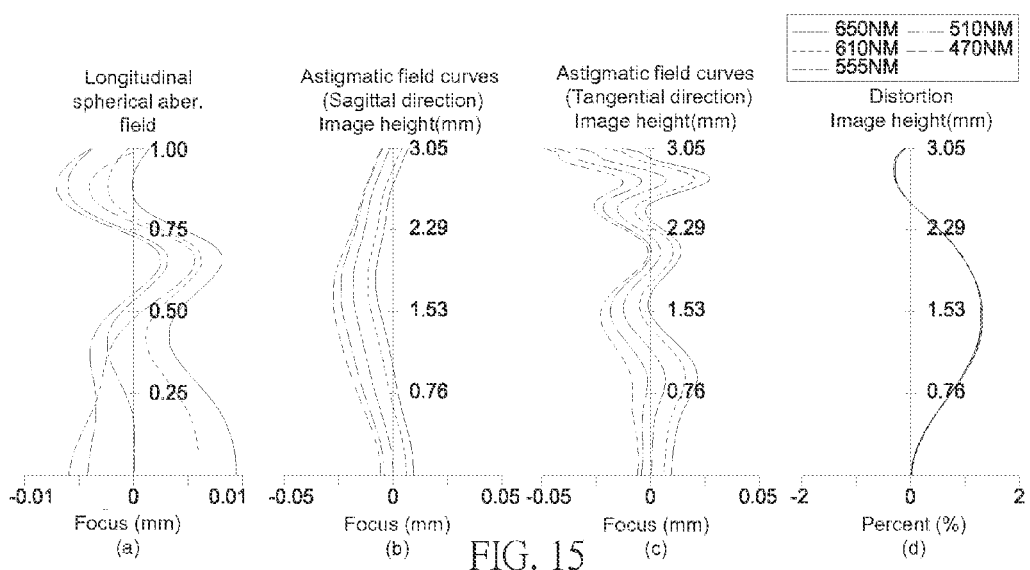
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having six lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the optical imaging lens 4 of the present embodiment, in an order from an object side A1 to an image side A2 along an optical axis, comprises an aperture stop 400, a first lens element 410, a second lens element 420, a third lens element 430, a fourth lens element 44, a fifth lens element 450 and a sixth lens element 460.

The differences between the fourth embodiment and the first embodiment are the radius of curvature and thickness of each lens element, the distance of each air gap, a back focal length and the configuration of the concave/convex shape of the object-side surfaces 461, but the configuration of the positive/negative refraction power of the first, second, third, fourth, fifth and sixth lens elements 410, 420, 430, 440, 450, 460 and configuration of the concave/convex shape of surfaces, comprising the object-side surfaces 411, 421, 431, 441, 451 facing to the object side A1 and the image-side surfaces 412, 422, 432, 442, 452, 462 facing to the image side A2, are similar to those in the first embodiment. Here, for clearly showing the drawings of the present embodiment, only the surface shapes which are different from that in the first embodiment are labeled. Specifically, the object-side surface 461 of the sixth lens element 460 is a convex surface comprising a convex portion 4611 in a vicinity of the optical axis and a convex portion 4612 in a vicinity of a periphery of the sixth lens element 460. Please refer to FIG. 16 for the optical characteristics of each lens elements in the optical imaging lens 4 of the present embodiment, please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 411 of the first lens element 410 to the image plane 480 along the optical axis is 5.15 mm and the length of the optical imaging lens 4 is shortened compared with conventional optical imaging lenses. Thus, the optical imaging lens 4 is capable to provide excellent imaging quality for smaller sized mobile devices.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d), and the present embodiment shows an easier manufacturing process than that of the first embodiment to provide a better yield. Therefore, according to the above illustration, the optical imaging lens of the present embodiment indeed shows great optical performance and the length of the optical imaging lens 4 is effectively shortened.

Figure 18:
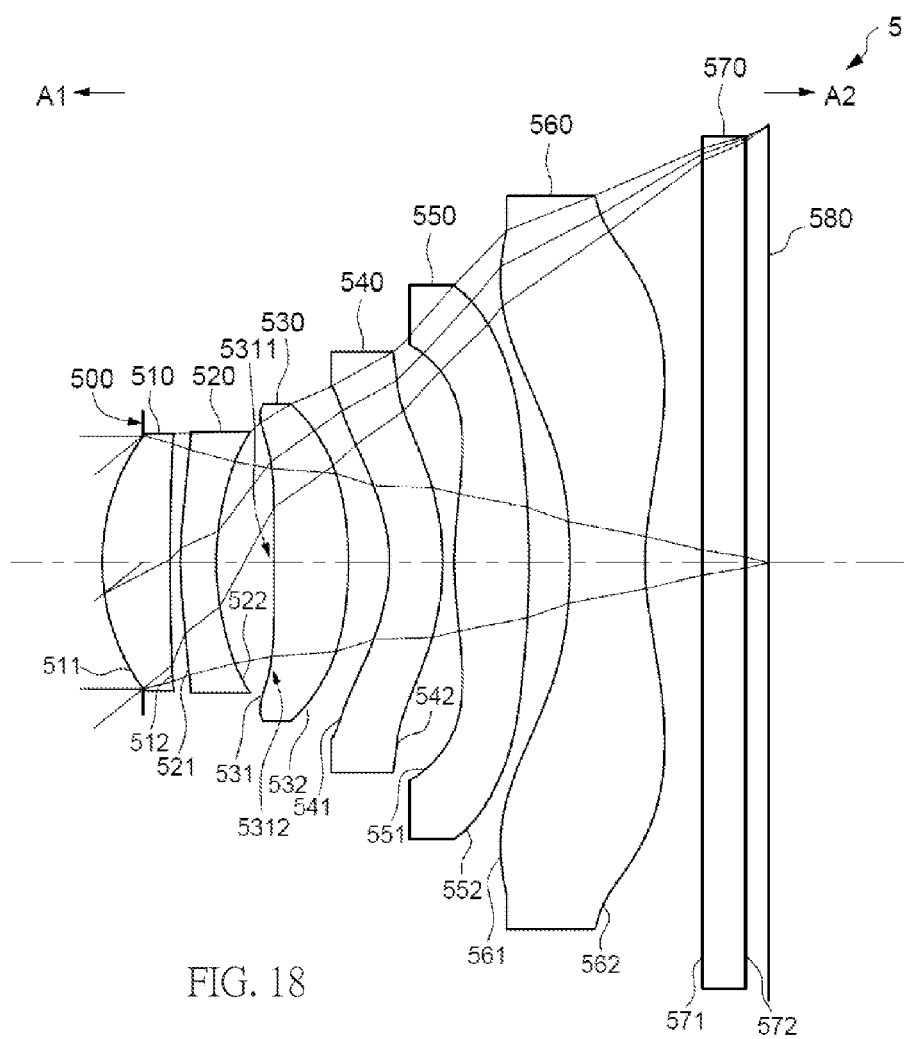
FIG. 18 is a cross-sectional view of a fifth embodiment of an optical imaging lens having six lens elements according to the present disclosure.
Figure 19:
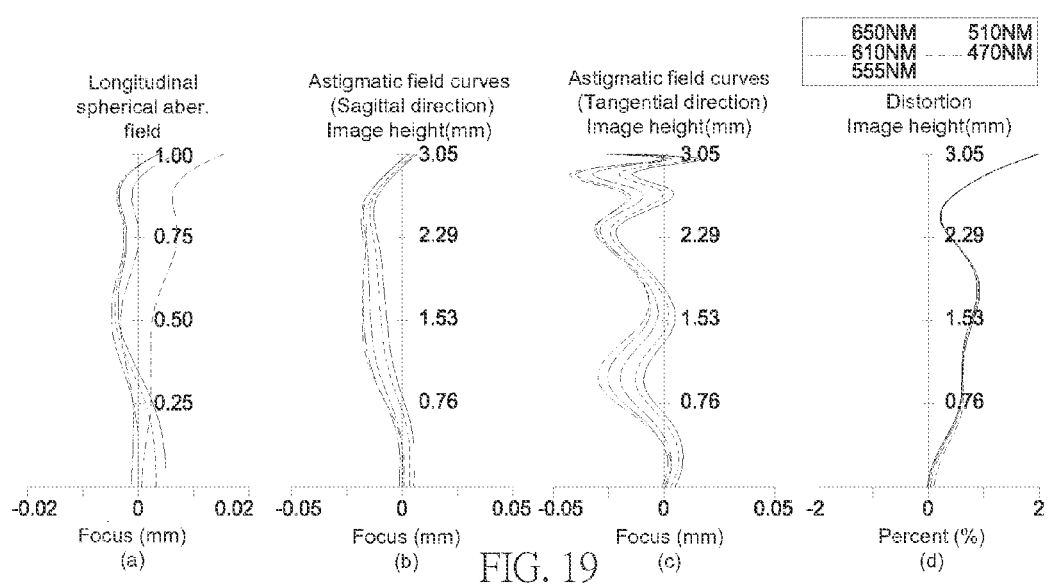
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having six lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the optical imaging lens 5 of the present embodiment, in an order from an object side A1 to an image side A2 along an optical axis, comprises an aperture stop 500, a first lens element 510, a second lens element 520, a third lens element 530, a fourth lens element 540, a fifth lens element 550 and a sixth lens element 560.

The differences between the fifth embodiment and the first embodiment are the radius of curvature and thickness of each lens element, the distance of each air gap, a back focal length and the configuration of the concave/convex shape of the object-side surface 531, but the configuration of the positive/negative refraction power of the first, second, third, fourth, fifth and sixth lens elements 510, 520, 530, 540, 550, 560 and configuration of the concave/convex shape of surfaces, comprising the object-side surfaces 511, 521, 541, 551, 561 facing to the object side A1 and the image-side surfaces 512, 522, 532, 542, 552, 562 facing to the image side A2, are similar to those in the first embodiment. Here, for clearly showing the drawings of the present embodiment, only the surface shapes which are different from that in the first embodiment are labeled. Specifically, the object-side surface 531 of the third lens element 530 comprises a convex portion 5311 in a vicinity of the optical axis and a concave portion 5312 in a vicinity of a periphery of the third lens element 530. Please refer to FIG. 20 for the optical characteristics of each lens elements in the optical imaging lens 5 of the present embodiment, and please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 511 of the first lens element 510 to the image plane 580 along the optical axis is 4.64 mm and the length of the optical imaging lens 5 is shortened compared with conventional optical imaging lenses and even with the optical imaging lens 1 of the first embodiment. Thus, the optical imaging lens 5 is capable to provide excellent imaging quality for smaller sized mobile devices.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
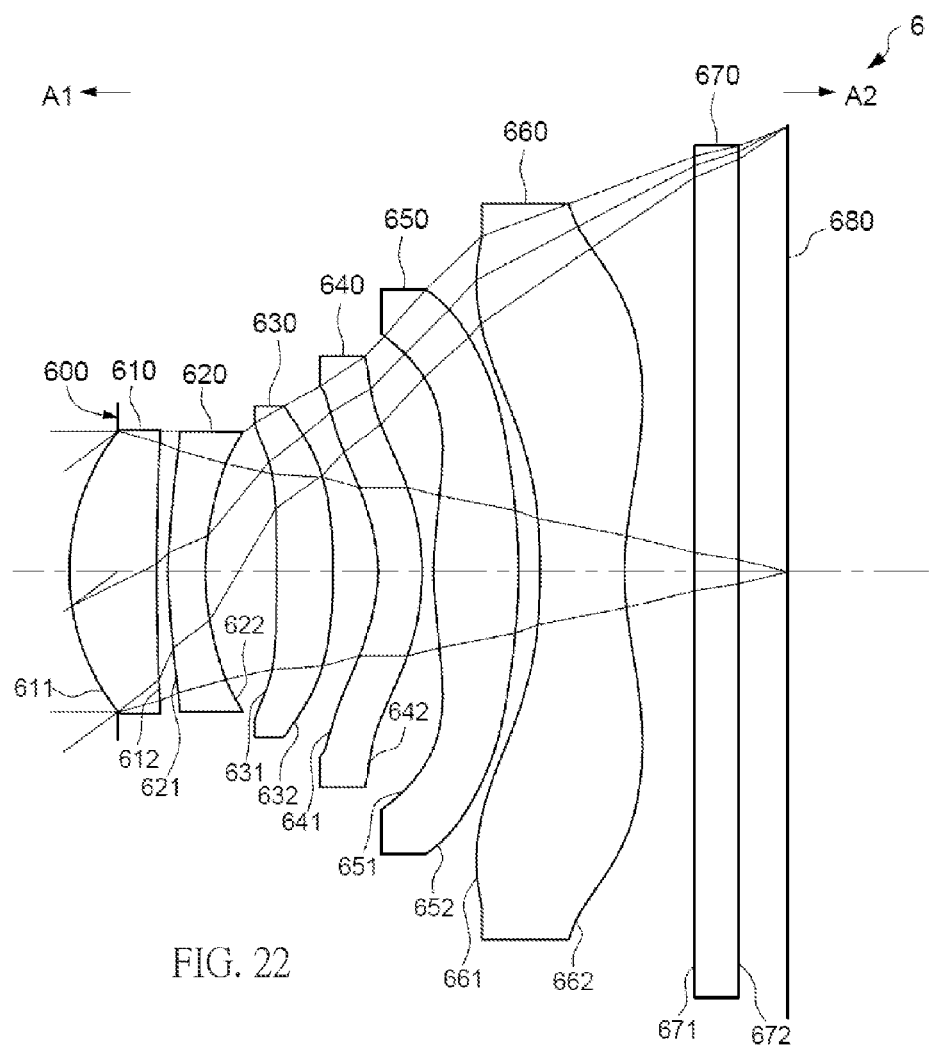
FIG. 22 is a cross-sectional view of a sixth embodiment of an optical imaging lens having six lens elements according to the present disclosure.
Figure 23:
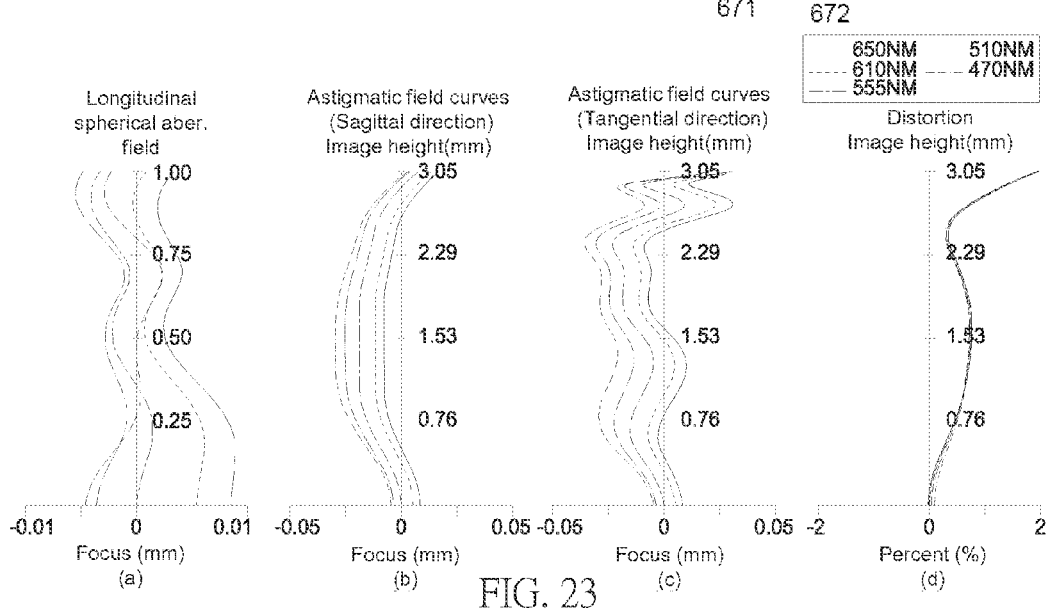
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having six lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the optical imaging lens 6 of the present embodiment, in an order from an object side A1 to an image side A2 along an optical axis, comprises an aperture stop 600, a first lens element 610, a second lens element 620, a third lens element 630, a fourth lens element 640, a fifth lens element 650 and a sixth lens element 660.

The differences between the sixth embodiment and the first embodiment are the radius of curvature and thickness of each lens element, the distance of each air gap, and a back focal length, but the configuration of the positive/negative refraction power of the first, second, third, fourth, fifth and sixth lens elements 610, 620, 630, 640, 650, 660 and configuration of the concave/convex shape of surfaces, comprising the object-side surfaces 611, 621, 631, 641, 651, 661 facing to the object side A1 and the image-side surfaces 612, 622, 632, 642, 652, 662 facing to the image side A2, are similar to those in the first embodiment. Here, for clearly showing the drawings of the present embodiment, only the surface shapes which are different from that in the first embodiment are labeled. Please refer to FIG. 24 for the optical characteristics of each lens elements in the optical imaging lens 6 of the present embodiment, and please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 611 of the first lens element 610 to the image plane 680 along the optical axis is 4.91 mm and the length of the optical imaging lens 6 is shortened compared with conventional optical imaging lenses. Thus, the optical imaging lens 6 is capable to provide excellent imaging quality for smaller sized mobile devices.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Reference is now made to FIGS. 26-29. FIG. 26 illustrates an example cross-sectional view of an optical imaging lens 7 having six lens elements of the optical imaging lens according to a seventh example embodiment. FIG. 27 shows example charts of longitudinal spherical aberration and other kinds of optical aberrations of the optical imaging lens 7 according to the seventh embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the optical imaging lens 7 of the present embodiment, in an order from an object side A1 to an image side A2 along an optical axis, comprises an aperture stop 700, a first lens element 710, a second lens element 720, a third lens element 730, a fourth lens element 740, a fifth lens element 750 and a sixth lens element 760.

The differences between the seventh embodiment and the first embodiment are the radius of curvature, thickness of each lens element, the distance of each air gap, a back focal length and the configuration of the concave/convex shape of the object-side surface 731, but the configuration of the positive/negative refraction power of the first, second, third, fourth and fifth lens elements 710, 720, 730, 740, 750 and configuration of the concave/convex shape of surfaces, comprising the object-side surfaces 711, 721, 741, 751, 761 facing to the object side A1 and the image-side surfaces 712, 722, 732, 742, 752, 762 facing to the image side A2, are similar to those in the first embodiment. Here, for clearly showing the drawings of the present embodiment, only the surface shapes which are different from that in the first embodiment are labeled. Specifically, the object-side surface 731 of the third lens element 730 comprises a convex portion 7311 in a vicinity of the optical axis and a concave portion 7312 in a vicinity of a periphery of the third lens element 730. Please refer to FIG. 28 for the optical characteristics of each lens elements in the optical imaging lens 7 of the present embodiment, and please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 711 of the first lens element 710 to the image plane 780 along the optical axis is 4.89 mm and the length of the optical imaging lens 7 is shortened compared with conventional optical imaging lenses. Thus, the optical imaging lens 7 is capable to provide excellent imaging quality for smaller sized mobile devices.

As shown in FIG. 27, the optical imaging lens 7 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 7 is effectively shortened.

Figure 30:
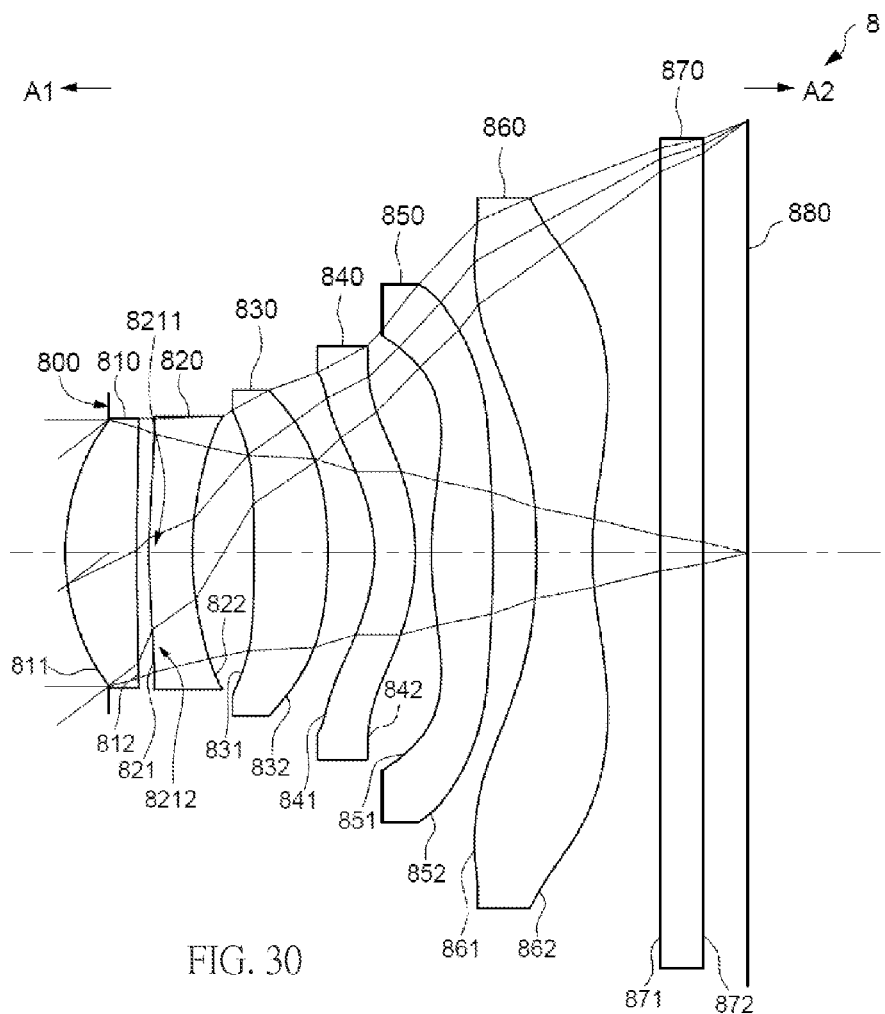
FIG. 30 is a cross-sectional view of a eighth embodiment of an optical imaging lens having six lens elements according to the present disclosure.
Figure 31:
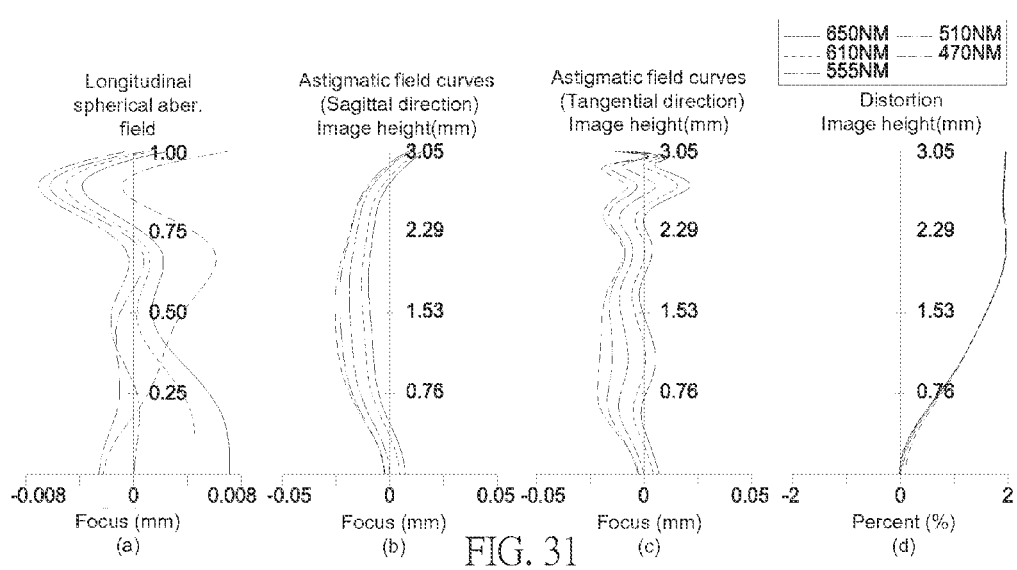
FIG. 31 is a chart of longitudinal spherical aberration and other kinds of optical aberrations of a eighth embodiment of the optical imaging lens according to the present disclosure.

Reference is now made to FIGS. 30-33. FIG. 30 illustrates an example cross-sectional view of an optical imaging lens 8 having six lens elements of the optical imaging lens according to a eighth example embodiment. FIG. 31 shows example charts of longitudinal spherical aberration and other kinds of optical aberrations of the optical imaging lens 8 according to the eighth embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the optical imaging lens 8 of the present embodiment, in an order from an object side A1 to an image side A2 along an optical axis, comprises an aperture stop 800, a first lens element 810, a second lens element 820, a third lens element 830, a fourth lens element 840, a fifth lens element 850 and a sixth lens element 860.

The differences between the eighth embodiment and the first embodiment are the radius of curvature and thickness of each lens element, the distance of each air gap, a back focal length and the configuration of the concave/convex shape of the object-side surface 821, but the configuration of the positive/negative refraction power of the first, second, third, fourth and fifth lens elements 810, 820, 830, 840, 850 and configuration of the concave/convex shape of surfaces, comprising the object-side surfaces 811, 831, 841, 851, 861 facing to the object side A1 and the image-side surfaces 812, 822, 832, 842, 852, 862 facing to the image side A2, are similar to those in the first embodiment. Here, for clearly showing the drawings of the present embodiment, only the surface shapes which are different from that in the first embodiment are labeled. Specifically, the object-side surface 821 of the second lens element 820 comprises a convex portion 8211 in a vicinity of the optical axis and a concave portion 8212 in a vicinity of a periphery of the second lens element 820. Please refer to FIG. 32 for the optical characteristics of each lens elements in the optical imaging lens 8 of the present embodiment, and please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 811 of the first lens element 810 to the image plane 880 along the optical axis is 4.81 mm and the length of the optical imaging lens 8 is shortened compared with conventional optical imaging lenses. Thus, the optical imaging lens 8 is capable to provide excellent imaging quality for smaller sized mobile devices.

As shown in FIG. 31, the optical imaging lens 8 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 8 is effectively shortened.

Figure 34:
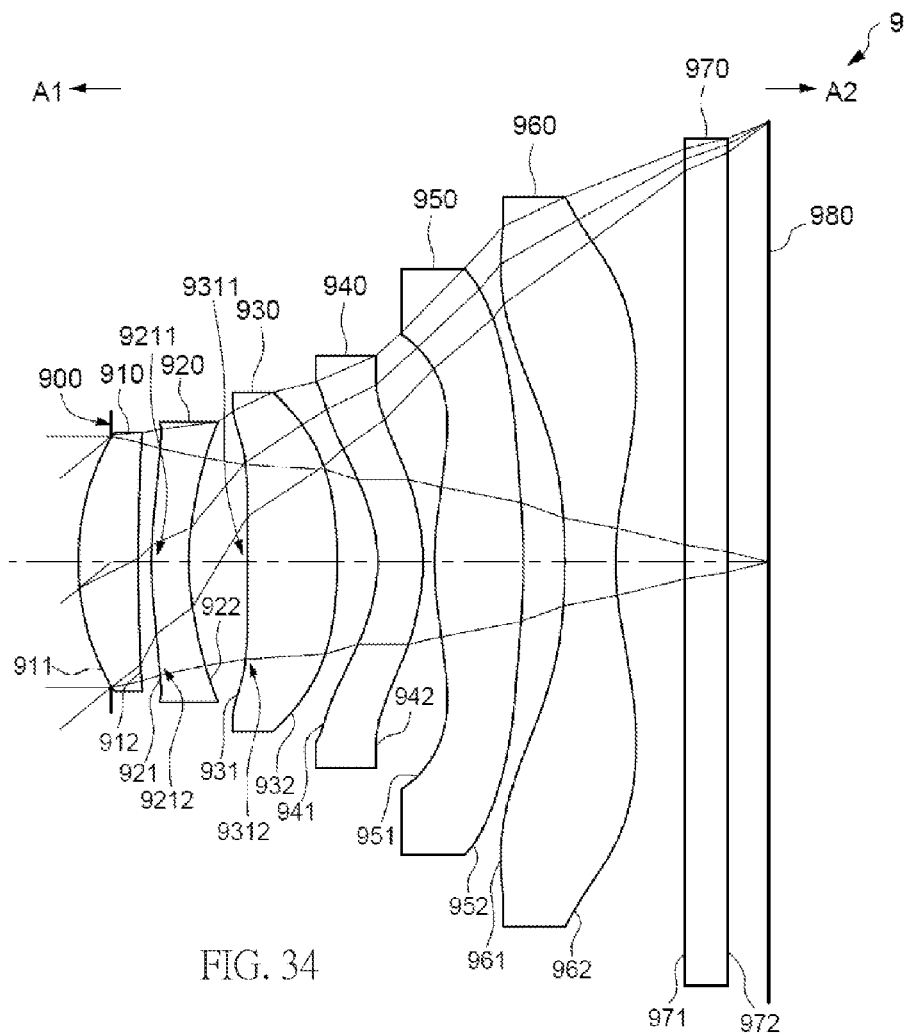
FIG. 34 is a cross-sectional view of a ninth embodiment of an optical imaging lens having six lens elements according to the present disclosure.
Figure 35:
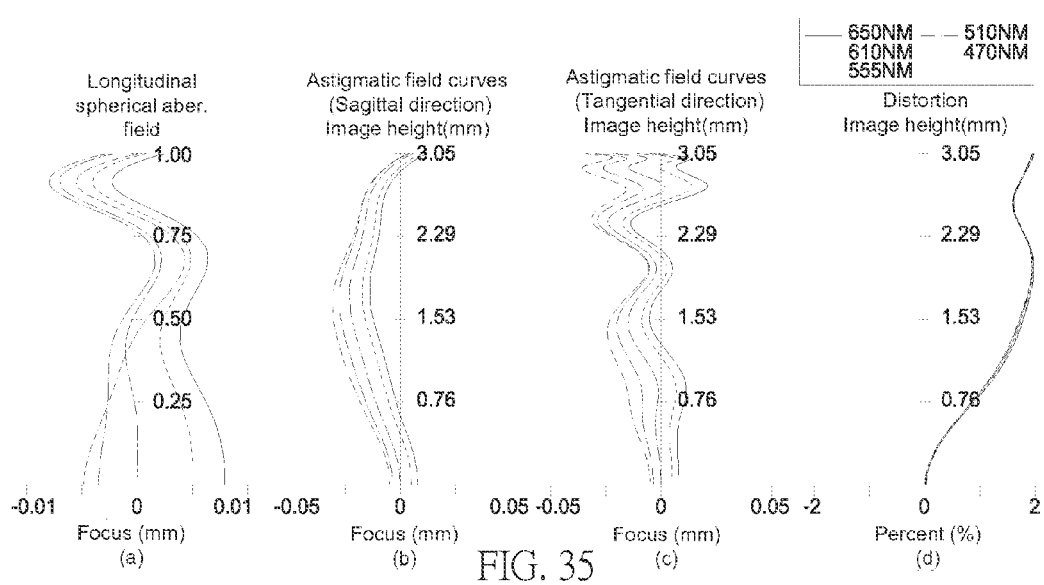
FIG. 35 is a chart of longitudinal spherical aberration and other kinds of optical aberrations of a ninth embodiment of the optical imaging lens according the present disclosure.

Reference is now made to FIGS. 34-37. FIG. 34 illustrates an example cross-sectional view of an optical imaging lens 9 having six lens elements of the optical imaging lens according to a ninth example embodiment. FIG. 35 shows example charts of longitudinal spherical aberration and other kinds of optical aberrations of the optical imaging lens 9 according to the ninth embodiment. FIG. 36 shows an example table of optical data of each lens element of the optical imaging lens 9 according to the ninth example embodiment. FIG. 37 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 34, the optical imaging lens 9 of the present embodiment, in an order from an object side A1 to an image side A2 along an optical axis, comprises an aperture stop 900, a first lens element 910, a second lens element 920, a third lens element 930, a fourth lens element 940, a fifth lens element 950 and a sixth lens element 960.

The differences between the ninth embodiment and the first embodiment are the radius of curvature and thickness of each lens element, the distance of each air gap, a back focal length and the configuration of the concave/convex shape of the object-side surfaces 921, 931, but the configuration of the positive/negative refraction power of the first, second, third and fourth lens elements 910, 920, 930, 940, 950 and configuration of the concave/convex shape of surfaces, comprising the object-side surfaces 911, 941, 951, 961 facing to the object side A1 and the image-side surfaces 912, 922, 932, 942, 952, 962 facing to the image side A2, are similar to those in the first embodiment. Here, for clearly showing the drawings of the present embodiment, only the surface shapes which are different from that in the first embodiment are labeled. Specifically, the object-side surface 921 of the second lens element 920 comprises a convex portion 9211 in a vicinity of the optical axis and a concave portion 9212 in a vicinity of a periphery of the second lens element 920; the object-side surface 931 of the third lens element 930 comprises a convex portion 9311 in a vicinity of the optical axis and a concave portion 9312 in a vicinity of a periphery of the third lens element 930. Please refer to FIG. 36 for the optical characteristics of each lens elements in the optical imaging lens 9 of the present embodiment, and please refer to FIG. 38 for the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of the present embodiment.

The distance from the object-side surface 911 of the first lens element 910 to the image plane 980 along the optical axis is 4.78 mm and the length of the optical imaging lens 9 is shortened compared with conventional optical imaging lenses. Thus, the optical imaging lens 9 is capable to provide excellent imaging quality for smaller sized mobile devices.

As shown in FIG. 35, the optical imaging lens 9 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 9 is effectively shortened.

Please refer to FIG. 38, which shows the values of TTL, ALT, Gaa, BFL, G23/G56, TTL/T4, T3/T4, TTL/T6, ALT/T2, TTL/T5, TTL/T1, TTL/T4, BFL/T4, ALT/T3, TTL/T3, Gaa/T4, BFL/T1, T1/T2, ALT/T1, Gaa/T3, G23/T4, TTL/G23, TTL/G34, and Gaa/T2 of all nine embodiments, and it is clear that the optical imaging lens of the present invention satisfy the Equations (1), (2), (3), (4), (5), (6), (7), (8), (9), (10), (11), (12), (13), (14), (15), (16), (17), (18), (19), and/or (20).

Figure 39:
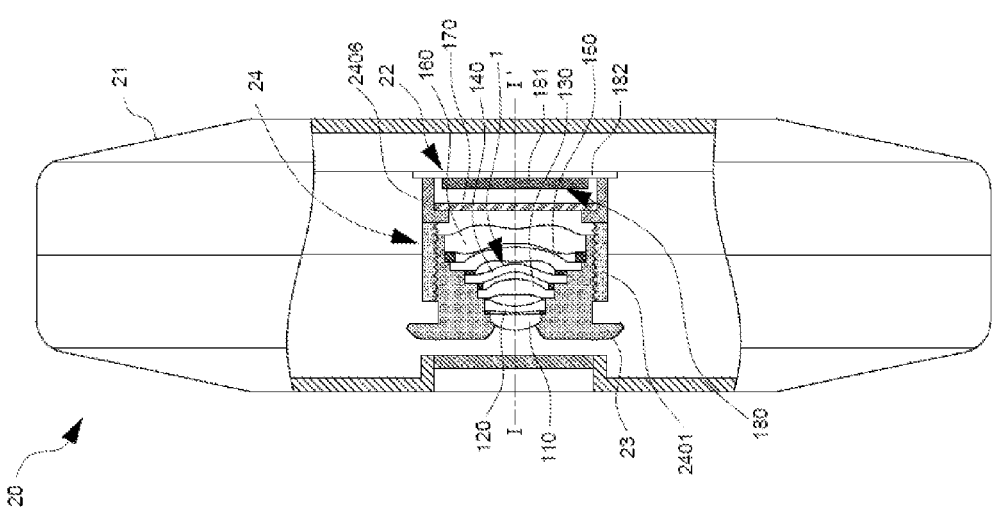
FIG. 39 is a structure of an example embodiment of a mobile device.

Reference is now made to FIG. 39, which illustrates an example structural view of a first embodiment of mobile device 20 applying an aforesaid optical imaging lens. The mobile device 20 comprises a housing 21 and a photography module 22 positioned in the housing 21. Examples of the mobile device 20 may be, but are not limited to, a mobile phone, a camera, a tablet computer, a personal digital assistant (PDA), etc.

As shown in FIG. 39, the photography module 22 may comprise an aforesaid optical imaging lens with five lens elements, which is a prime lens and for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 180 is formed on the image sensor 181.

In some other example embodiments, the structure of the filtering unit 170 may be omitted. In some example embodiments, the housing 21, the lens barrel 23, and/or the module housing unit 24 may be integrated into a single component or assembled by multiple components. In some example embodiments, the image sensor 181 used in the present embodiment is directly attached to a substrate 182 in the form of a chip on board (COB) package, and such package is different from traditional chip scale packages (CSP) since COB package does not require a cover glass before the image sensor 181 in the optical imaging lens 1. Aforesaid exemplary embodiments are not limited to this package type and could be selectively incorporated in other described embodiments.

The six lens elements 110, 120, 130, 140, 150, 160 are positioned in the lens barrel 23 in the way of separated by an air gap between any two adjacent lens elements.

The module housing unit 24 comprises a lens backseat 2401 for positioning the lens barrel 23 and an image sensor base 2406 positioned between the lens backseat 2401 and the image sensor 181. The lens barrel 23 and the lens backseat 2401 are positioned along a same axis I-I', and the lens backseat 2401 is close to the outside of the lens barrel 23. The image sensor base 2406 is exemplarily close to the lens backseat 2401 here. The image sensor base 2406 could be optionally omitted in some other embodiments of the present invention.

Because the length of the optical imaging lens 1 is merely 4.98 mm, the size of the mobile device 20 may be quite small. Therefore, the embodiments described herein meet the market demand for smaller sized product designs.

Figure 40:
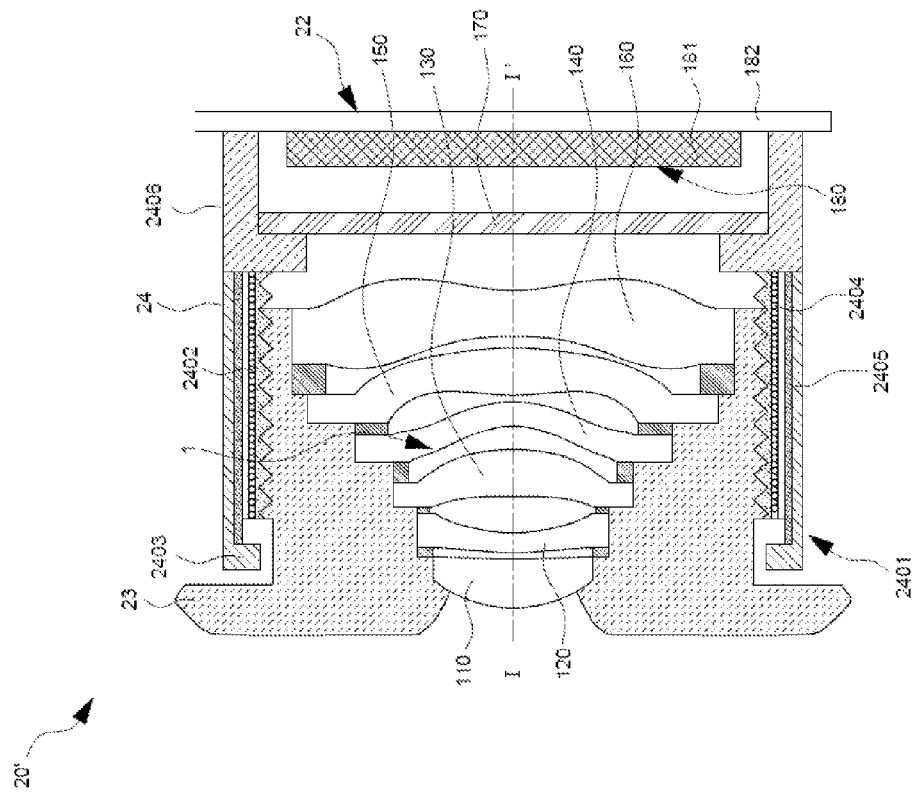
FIG. 40 is a partially enlarged view of the structure of another example embodiment of a mobile device.

Reference is now made to FIG. 40, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 is close to the outside of the lens barrel 23, and positioned along an axis I-I', and the second seat unit 2403 is around the outside of the first seat unit 2402 and positioned along with the axis I-I'. The coil 2404 is positioned between the first seat unit 2402 and the inside of the second seat unit 2403. The magnetic unit 2405 is positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' is similar to the mobile device 20.

Similarly, because the length of the optical imaging lens 1, 4.98 mm, is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling the detail structure of the lens elements and an inequality, the length of the optical imaging lens is effectively shortened and meanwhile good optical characteristics are still provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth, fifth and sixth lens elements, each of said first, second, third, fourth, fifth and sixth lens elements having refraction power, an object-side surface facing toward the object side and an image-side surface facing toward the image side and a central thickness defined along the optical axis, wherein:

said object-side surface of said first lens comprises a convex portion in a vicinity of the optical axis;

said image-side surface of the second lens element comprises a concave portion in a vicinity of a periphery of said second lens element, and said object-side surface of said second lens element comprises a convex portion in a vicinity of the optical axis;

said object-side surface of said third lens element comprises a concave portion in a vicinity of a periphery of said third lens element;

said object-side surface of said fourth lens element comprises a concave portion in a vicinity of the optical axis;

said fifth lens element has a positive refraction power, and said object-side surface of said fifth lens element comprises a convex portion in a vicinity of the optical axis;

said image-side surface of said sixth lens element comprises a concave portion in a vicinity of the optical axis;

the optical imaging lens comprises no other lenses having refraction power beyond the six lens elements; and an air gap between the second lens element and the third lens element along the optical axis is represented by G23, an air gap between the fifth lens element and the sixth lens element along the optical axis is represented by G56, a distance between the object-side surface of the first lens element and an image plane along the optical axis is represented by TTL, the central thickness along the optical axis of the third lens element is represented by T3, the central thickness along the optical axis of the fourth lens element is represented by T4, and G23, G56, TTL, T3, and T4 satisfy the equations:

$1.4 \leq G23/G56$;

$TTL/T4 \leq 19.0$; and $0.96 \leq T3/T4$.

2. The optical imaging lens according to claim 1, wherein the central thickness of the sixth lens element is represented by T6, and T6 and TTL satisfy the equation:

$8.0 \leq TTL/T6$.

3. The optical imaging lens according to claim 2, wherein the central thickness of the second lens element is represented by T2, a sum of the central thicknesses of all six lens elements is represented by ALT, and T2 and ALT satisfy the equation:

$ALT/T2 \leq 11.9$.

4. The optical imaging lens according to claim 1, wherein the central thickness of the fifth lens element is represented by T5, and T5 and TTL satisfy the equation:

$TTL/T5 \leq 15.0$.

5. The optical imaging lens according to claim 4, wherein the central thickness of the first lens element is represented by T1, and T1 and TTL satisfy the equation:

$8.6 \leq TTL/T1$.

6. The optical imaging lens according to claim 1, wherein, a back focal length of the optical imaging lens, which is defined as the distance from the image-side surface of the sixth lens element to the image plane along the optical axis is represented by BFL, and T4 and BFL satisfy the equation:

$2.3 \leq BFL/T4 \leq 5.3$.

7. The optical imaging lens according to claim 6, wherein a sum of the central thicknesses of all six lens elements is represented by ALT, and T3 and ALT satisfy the equation:

$ALT/T3 \leq 7.0$.

8. The optical imaging lens according to claim 1, wherein T3 and TTL satisfy the equation:

$TTL/T3 \leq 15.0$.

9. The optical imaging lens according to claim 8, wherein a sum of all five air gaps from the first lens element to the sixth lens element along the optical axis is represented by Gaa, and T4 and Gaa satisfy the equation:

$2.0 \leq Gaa/T4 \leq 5.0$.

10. The optical imaging lens according to claim 1, wherein the central thickness of the first lens element is represented by T1, a back focal length of the optical imaging lens, which is defined as the distance from the image-side surface of the sixth lens element to the image plane along the optical axis is represented by BFL, and T1 and BFL satisfy the equation:

$1.9 \leq BFL/T1 \leq 2.9$.

11. The optical imaging lens according to claim 10, wherein the central thickness of the second lens element is represented by T2, and T1 and T2 satisfy the equation:

$T1/T2 \leq 2.7$.

12. The optical imaging lens according to claim 1, wherein the central thickness of the first lens element is represented by T1, a sum of the central thicknesses of all six lens elements is represented by ALT, and T1 and ALT satisfy the equation:

$4.3 \leq ALT/T1$.

13. The optical imaging lens according to claim 12, wherein a sum of all five air gaps from the first lens element to the sixth lens element along the optical axis is represented by Gaa, and T3 and Gaa satisfy the equation:

$Gaa/T3 \leq 3.0$.

14. The optical imaging lens according to claim 13, wherein T4 and G23 satisfy the equation:

$1.0 \leq G23/T4 \leq 2.0$.

15. The optical imaging lens according to claim 1, wherein TTL and G23 satisfy the equation:

$TTL/G23 \leq 12.0$.

16. The optical imaging lens according to claim 15, wherein a sum of the central thicknesses of all six lens elements is represented by ALT, the central thickness of the first lens element is represented by T1, and T1 and ALT satisfy the equation:

$4.3 \leq ALT/T1$.

17. The optical imaging lens according to claim 1, wherein an air gap between the third lens element and the fourth lens element along the optical axis is G34, and TTL and G34 satisfy the equation:

$TTL/G34 \leq 25.0$.

18. The optical imaging lens according to claim 17, wherein a sum of all five air gaps from the first lens element to the sixth lens element along the optical axis is represented by Gaa, the central thickness of the second lens element is represented by T2, and Gaa and T2 satisfy the equation:

$3.5 \leq Gaa/T2$.

19. A mobile device, comprising:
a housing; and
a photography module positioned in the housing and comprising:
an optical imaging lens according to claim 1;
a lens barrel for positioning the optical imaging lens;
a module housing unit for positioning the lens barrel; and
an image sensor positioned at the image side of the optical imaging lens.

* * * * *